United States Patent
Wu et al.

(10) Patent No.: US 11,784,788 B2
(45) Date of Patent: Oct. 10, 2023

(54) IDENTITY MANAGEMENT METHOD, DEVICE, COMMUNICATIONS NETWORK, AND STORAGE MEDIUM

(71) Applicant: HUAWEI TECHNOLOGIES CO., LTD., Guangdong (CN)

(72) Inventors: Yizhen Wu, Shanghai (CN); Yada Huang, Shanghai (CN); He Guan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 525 days.

(21) Appl. No.: 17/009,145

(22) Filed: Sep. 1, 2020

(65) Prior Publication Data

US 2020/0396060 A1 Dec. 17, 2020

Related U.S. Application Data

(63) Continuation of application No. PCT/CN2019/079784, filed on Mar. 27, 2019.

(30) Foreign Application Priority Data

Mar. 27, 2018 (CN) .......................... 201810259814.5

(51) Int. Cl.
    *H04L 9/06*     (2006.01)
    *H04L 9/08*     (2006.01)
    (Continued)

(52) U.S. Cl.
    CPC .......... *H04L 9/0637* (2013.01); *H04L 9/0825* (2013.01); *H04L 9/3247* (2013.01); *H04L 9/50* (2022.05)

(58) Field of Classification Search
None
See application file for complete search history.

(56) References Cited

U.S. PATENT DOCUMENTS

2005/0138429 A1* 6/2005 Miura ................. G06Q 20/327
    726/4
2016/0294783 A1 10/2016 Piqueras Jover et al.
(Continued)

FOREIGN PATENT DOCUMENTS

CN     105701372 A     6/2016
CN     107079037 A     8/2017
(Continued)

OTHER PUBLICATIONS

Wang, X., et al., 2021. Blockchain-enabled fish provenance and quality tracking system. IEEE Internet of Things Journal, 9(11), pp. 8130-8142. (Year: 2021).*

(Continued)

*Primary Examiner* — Luu T Pham
*Assistant Examiner* — Edward X Long
(74) *Attorney, Agent, or Firm* — Fish & Richardson P.C.

(57) ABSTRACT

This application provides an identity management method, a device, a communications network, and a storage medium. The method includes generating, by a first control plane node, a first identification, a first public key, and a first private key for user equipment. The method also includes signing the first identification and the first public key based on a second private key of the first control plane node, to obtain first transaction data. The method further includes broadcasting the first transaction data in a blockchain network, where the first transaction data is to be used for consensus calculation in the blockchain network.

13 Claims, 17 Drawing Sheets

User equipment

(51) Int. Cl.
*H04L 9/32* (2006.01)
*H04L 9/00* (2022.01)

(56) References Cited

U.S. PATENT DOCUMENTS

| | | | |
|---|---|---|---|
| 2017/0345019 A1 | 11/2017 | Radocchia et al. | |
| 2018/0047023 A1* | 2/2018 | Bou | G06Q 20/20 |
| 2018/0060860 A1* | 3/2018 | Tian | G06Q 20/3674 |
| 2019/0279210 A1* | 9/2019 | Pen | G06Q 20/38215 |

FOREIGN PATENT DOCUMENTS

| | | | |
|---|---|---|---|
| CN | 107317672 A | 11/2017 | |
| CN | 107547514 A | 1/2018 | |
| CN | 107579817 A | 1/2018 | |
| WO | 2016179334 A1 | 11/2016 | |
| WO | 2017104899 A1 | 6/2017 | |
| WO | 2018049656 A1 | 3/2018 | |

OTHER PUBLICATIONS

Xinyi, Y., et al., Jul. 2018. Technical characteristics and model of blockchain. In 2018 10th international Conference on communication Software and networks (ICCSN) (pp. 562-566). IEEE. (Year: 2018).*

Nakamoto, "Bitcoin: A Peer-to-Peer Electronic Cash System," Mar. 2009, 9 pages.

Office Action issued in Chinese Application No. 201810259814.5 dated Mar. 16, 2020, 30 pages (with English translation).

PCT International Search Report and Written Opinion issued in International Application No. PCT/CN2019/079784 dated Jun. 17, 2019, 17 pages (with English translation).

* cited by examiner

IDENTITY MANAGEMENT METHOD, DEVICE, COMMUNICATIONS NETWORK, AND STORAGE MEDIUM

CROSS-REFERENCE TO RELATED APPLICATIONS

This application is a continuation of International Application No. PCT/CN2019/079784, filed on Mar. 27, 2019, which claims priority to Chinese Patent Application No. 201810259814.5, filed on Mar. 27, 2018. The disclosures of the aforementioned applications are hereby incorporated by reference in their entireties.

TECHNICAL FIELD

This disclosure relates to the field of communications technologies, and in particular, to an identity management method, a device, a communications network, and a storage medium.

BACKGROUND

A blockchain network uses a brand-new distributed architecture. Nodes in the blockchain network are independent and equivalent, separately store independent and complete data, and form a chain data structure by sequentially connecting the data. Between the nodes, a consensus mechanism is used to implement high consistency, and a point-to-point transmission technology is used to implement data synchronization. The blockchain network has features of being open-to-all and tamper-proof, and is already widely applied to a plurality of fields.

A distributed HSS implementation solution (Distributed Home Subscriber Server, dHSS) is proposed for a current long term evolution (LTE) communications network, so that identity registration of user equipment can be implemented by using a blockchain network. Referring to FIG. 1, a communications network includes user equipment and a blockchain network. The blockchain network includes a management device of a mobile network operator (MNO). The management device generates an identification j of the user equipment, and a public key $K_j^p$ and a private key $K_j^s$ that are corresponding to each other; signs the identification j and the public key $K_j^p$ based on the private key $K_o^s$ of the management device, to obtain transaction data, encapsulates the transaction data into an identity register message; and registers the identity register message with the blockchain network. Therefore, each node in the blockchain network verifies the transaction data based on the public key $K_o^p$ of the management device, and when the verification succeeds, the transaction data is stored in each node in the blockchain network. In addition, the management device delivers, to the user equipment, the identification j of the user equipment and the private key $K_j^s$, and the user equipment stores the identification and the private key.

Identifications of user equipment need to be centrally registered by the management device, so that this solution cannot be applicable to an internet of things (IoT) scenario including a massive quantity of user equipment. In addition, the delivered identification is exclusive to the management device, and is not open to another operator other than the MNO. Consequently, for one user equipment, a plurality of independent identifications need to be registered for different operators, and extra management costs are caused.

SUMMARY

This disclosure provides an identity management method, a device, a communications network, and a storage medium, to resolve a problem existing in the related art. The technical solutions are as follows:

According to a first aspect, an identity management method is provided. The identity management method is applied to a communications network, the communications network includes user equipment and a blockchain network, the blockchain network includes at least one control plane node and at least one data plane node, and the method includes:

generating, by a first control plane node in the at least one control plane node, a first identification, a first public key, and a first private key for the user equipment;

signing, by the first control plane node, the first identification and the first public key based on a second private key of the first control plane node, to obtain first transaction data; and broadcasting, by the first control plane node, the first transaction data in the blockchain network, where the first transaction data is to be used for consensus calculation in the blockchain network.

In a first possible implementation of the first aspect, the method further includes:

receiving, by a second control plane node in the at least one control plane node, the first transaction data and verifying, by the second control plane node, the first transaction data based on a second public key of the first control plane node, and after the verification succeeds, performing the consensus calculation on the first transaction data.

In a second possible implementation of the first aspect, the method further includes:

when the second control plane node determines that the first identification in the first transaction data is a new identification, signing the first transaction data based on a private key of the second control plane node, and sending signature data obtained after the first transaction data is signed to another control plane node in the at least one control plane node or the at least one data plane node.

In a third possible implementation of the first aspect, the method further includes:

sending, by a control plane node in the at least one control plane node, the first transaction data and signature data generated through the consensus calculation to the at least one data plane node for storage.

In a fourth possible implementation of the first aspect, the method further includes:

signing, by the first control plane node, a second identification and the second public key of the first control plane node based on the second private key, to obtain second transaction data; and broadcasting, by the first control plane node, the second transaction data in the blockchain network, where the second transaction data is to be used to register the first control plane node as a node in the blockchain network.

In a fifth possible implementation of the first aspect, the communications network further includes an authentication unit, and the method further includes:

receiving, by the authentication unit, first identification information sent by the user equipment;

querying, by the authentication unit based on the first identification information, the first transaction data corresponding to the first identification;

verifying, by the authentication unit, the first transaction data and after the verification succeeds, generating a first key, and encrypting the first key based on the first public key, to obtain a first encrypted ciphertext;

sending, by the authentication unit to the user equipment, the first encrypted ciphertext and identity management transaction data that is of the authentication unit;

receiving, by the authentication unit, a second encrypted ciphertext sent by the user equipment, where the second encrypted ciphertext includes the first key and a second key, and is to be used for authentication on the user equipment:

decrypting, by the authentication unit, the second encrypted ciphertext based on a third private key of the authentication unit, to obtain the first key and the second key; and encrypting, by the authentication unit, the second key based on the first public key, to obtain a third encrypted ciphertext; and sending the third encrypted ciphertext to the user equipment, where the third encrypted ciphertext is to be used for authentication on the authentication unit.

In a sixth possible implementation of the first aspect, the method further includes:

sending, by the user equipment, the first identification information to the authentication unit;

receiving, by the user equipment, the first encrypted ciphertext and the identity management transaction data that is of the authentication unit that are sent by the authentication unit;

decrypting, by the user equipment, the first encrypted ciphertext based on the first private key, to obtain the first key; and verifying the identity management transaction data, and if the verification succeeds, generating the second key;

encrypting, by the user equipment, the first key and the second key based on a third public key of the authentication unit, to obtain the second encrypted ciphertext, and sending the second encrypted ciphertext to the authentication unit; and receiving, by the user equipment, the third encrypted ciphertext sent by the authentication unit, and decrypting the third encrypted ciphertext based on the first private key, to obtain the second key.

In a seventh possible implementation of the first aspect, the method further includes:

configuring, by a control plane node in the at least one control plane node, a third identification, the third public key, and the third private key for the authentication unit; signing the third identification and the third public key based on a private key of the control plane node, to obtain the identity management transaction data of the authentication unit; and sending the identity management transaction data to the authentication unit, where the control plane node is included in an operator management device of the communications network.

In an eighth possible implementation of the first aspect, the first control plane node is included in an internet of things IoT industry customer entity, and the second control plane node is included in the operator management device or a third-party server of the communications network.

According to a second aspect, a control plane node is provided. The control plane node is applied to a communications network, the communications network includes user equipment and a blockchain network, the blockchain network includes the control plane node and at least one data plane node, and the control plane node includes:

a generation module, configured to generate a first identification, a first public key, and a first private key for the user equipment;

a first signature module, configured to sign the first identification and the first public key based on a second private key of the control plane node, to obtain first transaction data; and a first broadcasting module, configured to broadcast the first transaction data in the blockchain network, where the first transaction data is to be used for consensus calculation in the blockchain network.

In a first possible implementation of the second aspect, the control plane node further includes:

a sending module, configured to send the first transaction data and signature data generated through the consensus calculation to the at least one data plane node for storage.

In a second possible implementation of the second aspect, the control plane node further includes:

a second signature module, configured to sign a second identification and a second public key of the control plane node based on the second private key, to obtain second transaction data; and a second broadcasting module, configured to broadcast the second transaction data in the blockchain network, where the second transaction data is to be used to register the control plane node as a node in the blockchain network.

In a third possible implementation of the second aspect, the control plane node is included in an internet of things IoT industry customer entity.

According to a third aspect, a control plane node is provided. The control plane node is applied to a communications network, the communications network includes user equipment and a blockchain network, the blockchain network includes the control plane node, at least one other control plane node, and at least one data plane node, and the control plane node includes:

a receiving module, configured to receive first transaction data, where the first transaction data is obtained after a first identification and a first public key of the user equipment are signed based on a second private key of a first control plane node other than the control plane node; and a consensus calculation module, configured to: verify the first transaction data based on a second public key of the first control plane node, and after the verification succeeds, perform consensus calculation on the first transaction data.

In a first possible implementation of the third aspect, the consensus calculation module is further configured to: when determining that the first identification in the first transaction data is a new identification, sign the first transaction data based on a private key of the control plane node, and send signature data obtained after the first transaction data is signed to another control plane node in the at least one control plane node or the at least one data plane node.

In a second possible implementation of the third aspect, the control plane node further includes:

a sending module, configured to send the first transaction data and signature data generated through the consensus calculation to the at least one data plane node for storage.

In a third possible implementation of the third aspect, the control plane node further includes:

a signature module, configured to: configure a third identification, a third public key, and a third private key for an authentication unit; and sign the third identification and the third public key based on the private key of the control plane node, to obtain identity management transaction data of the authentication unit; and the sending module is configured to send the identity management transaction data to the authentication unit, where the control plane node is included in an operator management device of the communications network.

In a fourth possible implementation of the third aspect, the control plane node is included in the operator management device or a third-party server of the communications network.

According to a fourth aspect, an authentication unit is provided. The authentication unit is applied to a communications network, the communications network includes user equipment, a blockchain network, and the authentication unit, the blockchain network includes at least one control plane node and at least one data plane node, and the authentication unit includes:

a receiving module, configured to receive first identification information sent by the user equipment;

a query module, configured to query, based on the first identification information, first transaction data corresponding to a first identification;

an encryption module, configured to: verify the first transaction data; and after the verification succeeds, generate a first key, and encrypt the first key based on a first public key of the user equipment, to obtain a first encrypted ciphertext;

a sending module, configured to send, to the user equipment, the first encrypted ciphertext and identity management transaction data that is of the authentication unit, where the receiving module is further configured to receive a second encrypted ciphertext sent by the user equipment, where the second encrypted ciphertext includes the first key and a second key, and is to be used for authentication on the user equipment; and a decryption module, configured to decrypt the second encrypted ciphertext based on a third private key of the authentication unit, to obtain the first key and the second key, where the encryption module is further configured to: encrypt the second key based on the first public key, to obtain a third encrypted ciphertext; and send the third encrypted ciphertext to the user equipment, where the third encrypted ciphertext is to be used for authentication on the authentication unit.

According to a fifth aspect, a communications apparatus is provided. The communications apparatus is applied to a communications network, the communications network includes the communications apparatus, a blockchain network, and an authentication unit, the blockchain network includes at least one control plane node and at least one data plane node, and the communications apparatus includes:

a sending module, configured to send first identification information to the authentication unit;

a receiving module, configured to receive a first encrypted ciphertext and identity management transaction data that is of the authentication unit that are sent by the authentication unit;

a decryption module, configured to: decrypt the first encrypted ciphertext based on a first private key, to obtain a first key; and verify the identity management transaction data, and if the verification succeeds, generate a second key; and an encryption module, configured to: encrypt the first key and the second key based on a third public key of the authentication unit, to obtain a second encrypted ciphertext, and send the second encrypted ciphertext to the authentication unit, where the receiving module is further configured to receive a third encrypted ciphertext sent by the authentication unit, and the decryption module is further configured to decrypt the third encrypted ciphertext based on the first private key, to obtain the second key.

According to a sixth aspect, a control plane node is provided. The control plane node is applied to a communications network, the communications network includes user equipment and a blockchain network, the blockchain network includes at least one control plane node and at least one data plane node, the control plane node includes a processor, the processor is coupled to a memory, the memory stores at least one instruction, and the processor is configured to invoke the instruction, to perform the following operations:

generating a first identification, a first public key, and a first private key for the user equipment;

signing the first identification and the first public key based on a second private key of the control plane node, to obtain first transaction data; and broadcasting the first transaction data in the blockchain network, where the first transaction data is to be used for consensus calculation in the blockchain network.

In a first possible implementation of the sixth aspect, the processor is configured to invoke the instruction, to perform the following operation:

sending the first transaction data and signature data generated through the consensus calculation to the at least one data plane node for storage.

In a second possible implementation of the sixth aspect, the processor is further configured to invoke the instruction, to perform the following operations:

signing a second identification and a second public key of the control plane node based on the second private key, to obtain second transaction data; and broadcasting the second transaction data in the blockchain network, where the second transaction data is to be used to register the control plane node as a node in the blockchain network.

In a third possible implementation of the sixth aspect, the control plane node is included in an internet of things IoT industry customer entity.

According to a seventh aspect, a control plane node is provided. The control plane node is applied to a communications network, the communications network includes user equipment and a blockchain network, the blockchain network includes the control plane node, at least one other control plane node, and at least one data plane node, the control plane node includes a processor, the processor is coupled to a memory, the memory stores at least one instruction, and the processor is configured to invoke the instruction, to perform the following operations:

receiving first transaction data, where the first transaction data is obtained after a first identification and a first public key of the user equipment are signed based on a second private key of a first control plane node other than the control plane node; and verifying the first transaction data based on a second public key of the first control plane node, and after the verification succeeds, performing consensus calculation on the first transaction data.

In a first possible implementation of the seventh aspect, the processor is configured to invoke the instruction, to perform the following operations:

when determining that the first identification in the first transaction data is a new identification, signing the first transaction data based on a private key of the control plane node, and sending signature data obtained after the first transaction data is signed to another control plane node in the at least one control plane node or the at least one data plane node.

In a second possible implementation of the seventh aspect, the processor is configured to invoke the instruction, to perform the following operation:

sending the first transaction data and signature data generated through the consensus calculation to the at least one data plane node for storage.

In a third possible implementation of the seventh aspect, the processor is configured to invoke the instruction, to perform the following operations:

configuring a third identification, a third public key, and a third private key for an authentication unit; signing the third identification and the third public key based on the private key of the control plane node, to obtain identity management transaction data of the authentication unit; and sending the identity management transaction data to the authentication unit, where the control plane node is included in an operator management device of the communications network.

In a fourth possible implementation of the seventh aspect, the control plane node is included in the operator management device or a third-party server of the communications network.

According to an eighth aspect, an authentication unit is provided. The authentication unit is applied to a communications network, the communications network includes user equipment, a blockchain network, and the authentication unit, the blockchain network includes at least one control plane node and at least one data plane node, the authentication unit includes a processor, the processor is coupled to a memory, the memory stores at least one instruction, and the processor is configured to invoke the instruction, to perform the following operations:

receiving first identification information sent by the user equipment;

querying, based on the first identification information, first transaction data corresponding to a first identification;

verifying the first transaction data; and after the verification succeeds, generating a first key, and encrypting the first key based on a first public key of the user equipment, to obtain a first encrypted ciphertext:

sending, to the user equipment, the first encrypted ciphertext and identity management transaction data that is of the authentication unit;

receiving a second encrypted ciphertext sent by the user equipment, where the second encrypted ciphertext includes the first key and a second key, and is to be used for authentication on the user equipment;

decrypting the second encrypted ciphertext based on a third private key of the authentication unit, to obtain the first key and the second key; and encrypting the second key based on the first public key, to obtain a third encrypted ciphertext; and sending the third encrypted ciphertext to the user equipment, where the third encrypted ciphertext is to be used for authentication on the authentication unit.

According to a ninth aspect, a communications apparatus is provided. The communications apparatus is applied to a communications network, the communications network includes the communications apparatus, a blockchain network, and an authentication unit, the blockchain network includes at least one control plane node and at least one data plane node, the communications apparatus includes a processor, the processor is coupled to a memory, the memory stores at least one instruction, and the processor is configured to invoke the instruction, to perform the following operations:

sending first identification information to the authentication unit;

receiving a first encrypted ciphertext and identity management transaction data that is of the authentication unit that are sent by the authentication unit;

decrypting the first encrypted ciphertext based on a first private key, to obtain a first key; and verifying the identity management transaction data, and if the verification succeeds, generating a second key;

encrypting the first key and the second key based on a third public key of the authentication unit, to obtain a second encrypted ciphertext, and sending the second encrypted ciphertext to the authentication unit; and receiving a third encrypted ciphertext sent by the authentication unit, and decrypting the third encrypted ciphertext based on the first private key, to obtain the second key.

According to a tenth aspect, a communications network is provided. The communications network includes: the authentication unit according to the eighth aspect; the communications apparatus according to the ninth aspect; and a blockchain network, where the blockchain network includes the control plane node according to the sixth aspect, the control plane node according to the seventh aspect, and at least one data plane node.

According to an eleventh aspect, a computer-readable storage medium is provided. The computer-readable storage medium stores at least one instruction; and when the computer-readable storage medium is run on a computer, the computer is enabled to perform an operation performed by the control plane node according to the sixth aspect; or the computer is enabled to perform an operation performed by the control plane node according to the seventh aspect; or the computer is enabled to perform an operation performed by the authentication unit according to the eighth aspect; or the computer is enabled to perform an operation performed by the communications apparatus according to the ninth aspect.

According to a fourteenth aspect, a computer program product is provided. The computer program product includes at least one instruction; and when the computer program product is run on a computer, the computer is enabled to perform an operation performed by the control plane node according to the sixth aspect; or the computer is enabled to perform an operation performed by the control plane node according to the seventh aspect; or the computer is enabled to perform an operation performed by the authentication unit according to the eighth aspect; or the computer is enabled to perform an operation performed by the communications apparatus according to the ninth aspect.

The technical solutions provided in embodiments of this disclosure have the following beneficial effects:

In the embodiments of this disclosure, the first control plane node in the blockchain network generates the first identification, the first public key, and the first private key for the user equipment; signs the first identification and the first public key based on the second private key, to obtain the first transaction data of the user equipment; and broadcasts the first transaction data in the blockchain network. Therefore, the first transaction data is registered with the blockchain network, and the identification is registered. This solution can be applicable to an IoT scenario. In addition, the delivered identification is not limited by the operator management device and may be open to management devices of a plurality of operators in the blockchain network; and for one user equipment, there is no need to register a plurality of identifications for different operators, so that waste of unnecessary management costs is avoided and identification resources are saved.

In the embodiments of this disclosure, the control plane node and the data plane node are separated, so that each node can be prevented from performing both consensus calculation of a control plane and a storage operation of a data plane. Therefore, operation efficiency of the node is improved, and scalability and privacy are improved.

In the embodiments of this disclosure, through deployment of the authentication unit, the authentication unit and the user equipment implement mutual authentication, and the user equipment does not need to perform excessive interaction with a core network. This avoids bringing severe control signaling load to the core network and improves network performance. In addition, a base station does not need to be improved, so that an implementation difficulty is relatively small.

DESCRIPTION OF EMBODIMENTS

Figure 1:
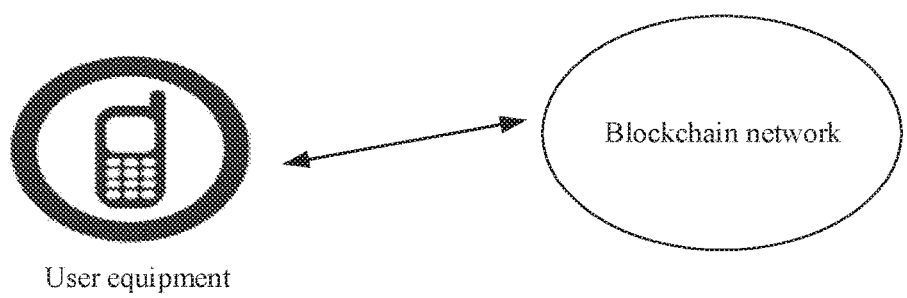
FIG. 1 is a schematic structural diagram of a communications network according to the related art.

To make objectives, technical solutions, and advantages of this disclosure clearer, the following further describes implementations of this disclosure in detail with reference to the accompanying drawings.

First, a blockchain network in embodiments of this disclosure is described as follows.

Anode in the blockchain network is a basic unit that can perform operations such as data verification, data storage, and data forwarding. Data in the blockchain network is referred to as transaction data. Each node stores independent and complete transaction data, thereby implementing distributed storage. In addition, each node may maintain and manage the transaction data, and implement transaction data synchronization by using a point-to-point transmission technology.

Nodes in the blockchain network are classified into two types: a control plane node and a data plane node. The control plane node is configured to perform an operation on a control plane, and each control plane node implements consensus calculation on transaction data. The data plane node is configured to: perform an operation on a data plane, and store transaction data on which consensus calculation is already completed. In a possible implementation, when a node is registered as a control plane node in the blockchain network, the node may be registered as a data plane node in the blockchain network by default. In addition to these data plane nodes that are registered by default, another data plane node may also be registered separately, to ensure that a quantity of data plane nodes is sufficient.

For example, the blockchain network includes an IoT industry customer entity, an operator management device, and a third-party server. All of the three devices may be used as control plane nodes to perform consensus calculation on transaction data requested to be registered, or may be used as data plane nodes to store transaction data on which consensus calculation is completed.

(1) Point-to-point transmission: Nodes in a blockchain network are independent and equivalent, and a point-to-point transmission technology is used to implement transaction data synchronization between the nodes. Different nodes may be different physical machines, or may be different instances on a cloud.

(2) Consensus calculation: Consensus calculation refers to a process of reaching a consensus on data, behavior, a procedure, and the like through interaction between nodes.

A consensus algorithm refers to a protocol, a rule, and the like of a consensus calculation process; and each node implements the consensus calculation process based on the consensus algorithm, and finally achieves a consistent consensus result. For example, for transaction data requested to be registered, each node determines, based on the consensus algorithm, that verification on the transaction data succeeds.

(3) Distributed data storage: Data plane nodes in a blockchain network store transaction data in blocks, form a chain data structure by connecting a plurality of blocks in a chronological order, and separately store independent and complete transaction data, to ensure that the transaction data is open-to-all. A distributed data storage manner depends on independent and equivalent nodes in the blockchain network, and the nodes need to implement highly consistent storage through consensus calculation.

Figure 2:
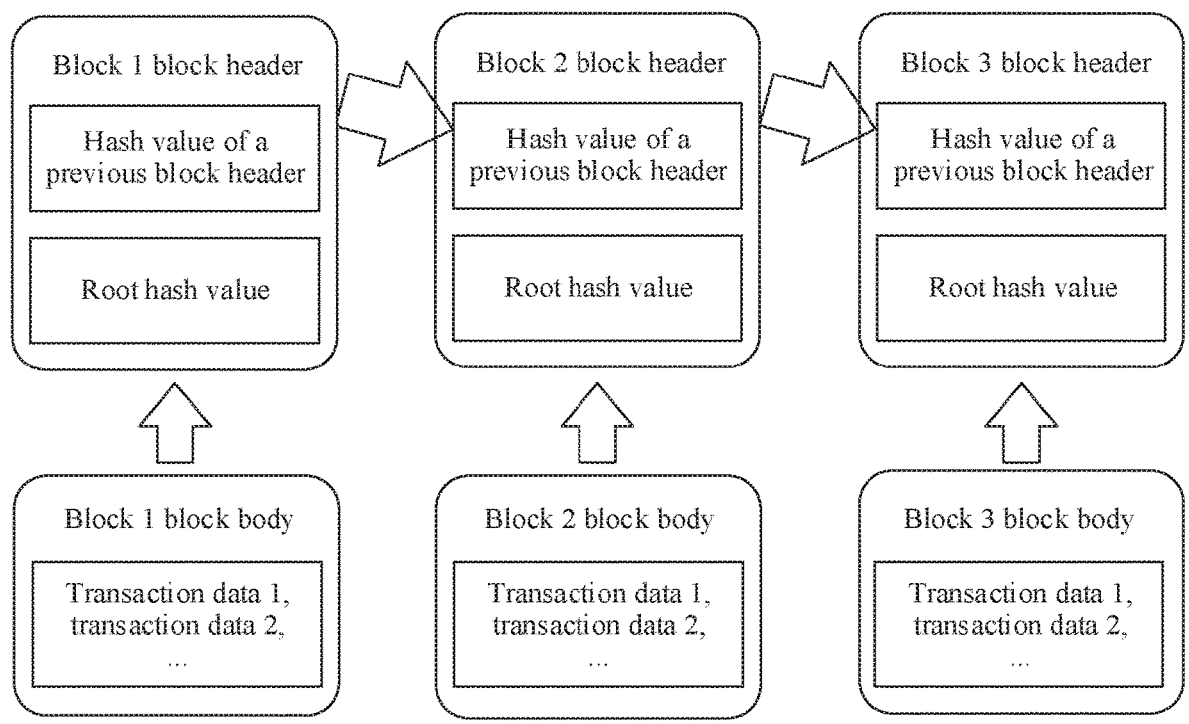
FIG. 2 is a schematic diagram of a blockchain according to an embodiment of this disclosure.

Referring to FIG. 2, a block is formed by organizing one or more pieces of transaction data in a form of a "block". A size of the block may be defined based on an actual application scenario. A chain refers to a data structure in which blocks are connected in a chronological order. Each block in a blockchain includes a block header and a block body. The block body includes transaction data. The block header includes a root hash value of all transaction data in the block and a hash value of a block header of a previous block. The data structure of the blockchain may ensure that the stored transaction data cannot be tampered with.

(4) Cryptography theory: Between nodes, a cryptographic technology is used to implement propagation of transaction data, and a combination of the cryptographic technology and consensus calculation is used to ensure that the transaction data cannot be tampered with or forged.

Figure 3:
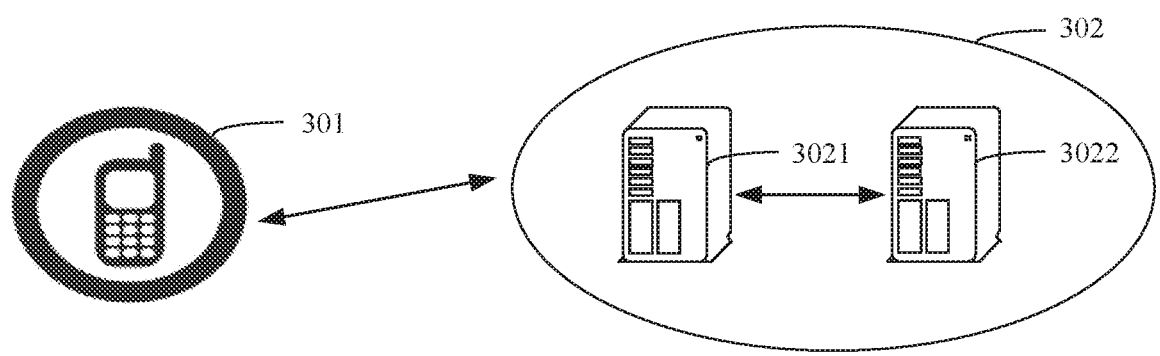
FIG. 3 is a schematic structural diagram of a communications network according to an embodiment of this disclosure.

FIG. 3 is a schematic structural diagram of a communications network according to an embodiment of this disclosure. Referring to FIG. 3, the communications network includes: user equipment 301 and a blockchain network 302. The blockchain network 302 includes at least one control plane node 3021 and at least one data plane node 3022.

The user equipment 301 may be a plurality of types of devices, such as a mobile phone, a computer, a water meter, an electricity meter, a camera, a smart vehicle, an unmanned aerial vehicle, and a smart watch. Actually, the communications network may be open to a plurality of industries, and user equipment 301 in the plurality of industries may access the communications network. User equipment 301 in different industries may be of a same type or different types.

When a control plane node 3021 broadcasts transaction data in the blockchain network 302, the at least one control plane node 3021 performs consensus calculation on the transaction data, and after the consensus calculation is completed, the transaction data is stored in the at least one data plane node 3022. The at least one control plane node 3021 may include a plurality of types of devices that are separately configured to implement different functions.

In a possible implementation, the at least one control plane node 3021 may include an IoT industry customer entity. The IoT industry customer entity is configured to: manage user equipment 301 in the industry, and mainly implement a process of generating, delivering, and managing an identification of the user equipment 301. In addition, the IoT industry customer entity is used as a control plane node in the blockchain network, and is configured to: register transaction data with the blockchain network, and perform consensus calculation on the to-be-registered transaction data; and the IoT industry customer entity may also be used as a data plane node in the blockchain network, and is configured to store the registered transaction data. Actually, for each industry, a corresponding IoT industry customer entity may be set, and user equipment 301 of the corresponding industry accesses a network by using the IoT industry customer entity. IoT industry customer entities of different industries are different.

For example, an IoT industry customer entity in the mobile phone industry may generate, register, and deliver an identification for a mobile phone, and therefore, the mobile phone is enabled to access a communications network; an IoT industry customer entity in the tap water industry may generate, register, and deliver an identification for a water meter, and therefore, the water meter is enabled to access a communications network.

In another possible implementation, the at least one control plane node 3021 may alternatively include an operator management device. The operator management device is used as a control plane node in the blockchain network, and is configured to perform consensus calculation on to-be-registered transaction data; and the operator management device may also be used as a data plane node in the blockchain network, and is configured to store the registered transaction data. In addition, the operator management device belongs to an operator, and is maintained and managed by the operator. Actually, the blockchain network may include management devices of different operators, and therefore, the transaction data can be open to a plurality of operators. Therefore, for user equipment, for one user equipment, only one universal identification may be registered for different operators, and there is no need to register a plurality of identifications, so that management costs are reduced and identification resources are saved.

In another possible implementation, the at least one control plane node 3021 may alternatively include a third-party server. The third-party server is used as a control plane node in the blockchain network, and is configured to perform consensus calculation on to-be-registered transaction data; and the third-party server may also be used as a data plane node in the blockchain network, and is configured to store the registered transaction data. In addition, the third-party server is further configured to provide a plurality of services of an application layer for the user equipment 301 accessing the communications network.

Figure 4:
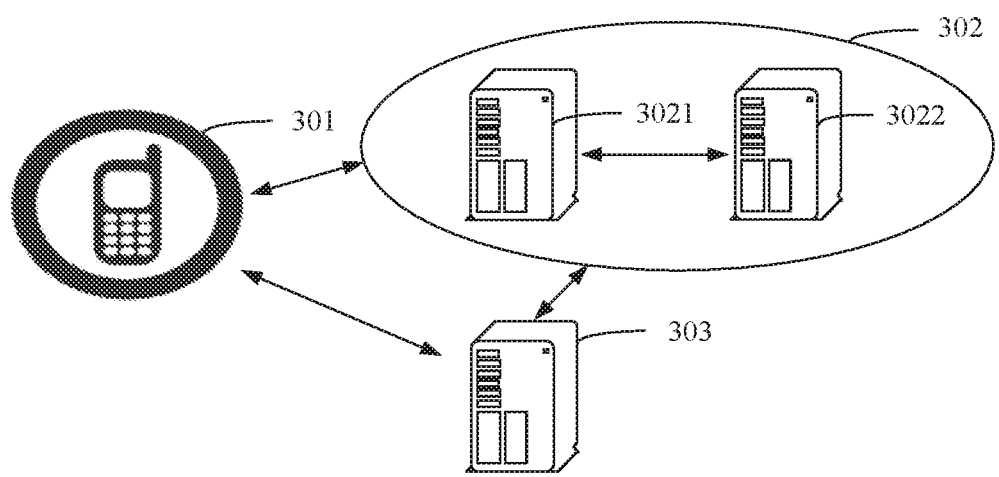
FIG. 4 is a schematic structural diagram of another communications network according to an embodiment of this disclosure.

In another possible implementation, referring to FIG. 4, the communications network may further include an authentication unit 303. In an access process of the user equipment 301, through interaction with the user equipment 301 and the control plane node 3021 in the blockchain network 302, the authentication unit 303 may implement access authentication on the user equipment 301.

It should be noted that nodes in the blockchain network may be used as control plane nodes. These control plane nodes participate in a consensus calculation process of a blockchain control plane, and mainly determine, according to a preset rule, whether a device identification requested to be registered is a valid identification. In addition, the nodes in the blockchain network may also be used as data plane nodes. These data plane nodes participate in a data storage process of a blockchain data plane, and mainly store, in an orderly manner, the identification that is determined as a valid identification through consensus calculation by the control plane nodes.

Figure 5:
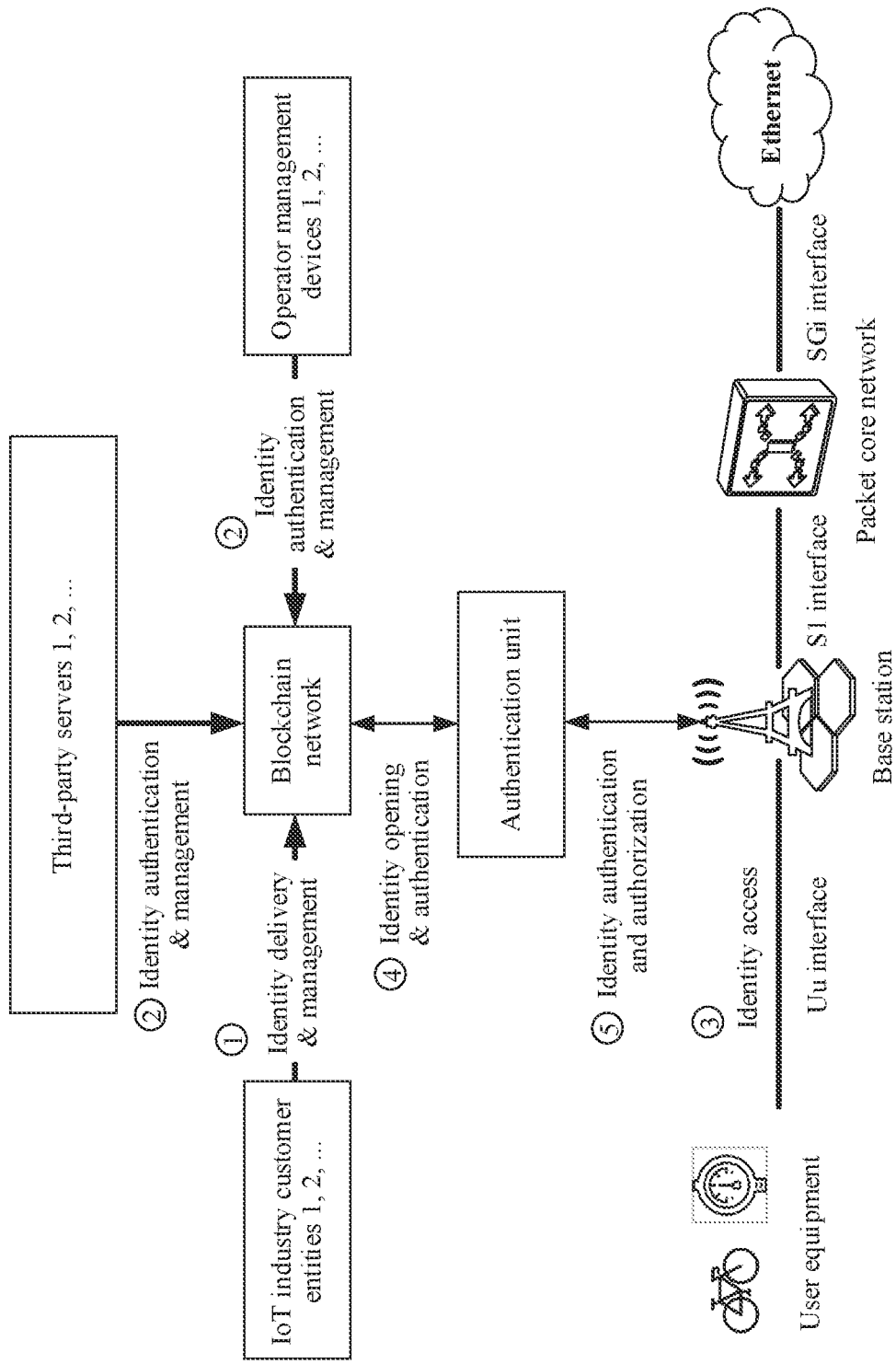
FIG. 5 is a schematic structural diagram of another communications network according to an embodiment of this disclosure.

Referring to FIG. 5, an embodiment of this disclosure provides a blockchain network including distributed identity delivery, access authentication, access control, and roaming management functions. The blockchain network has four external interfaces, including interfaces to an industry customer, a mobile network operator, an authentication entity, and a third-party application. Therefore, an IoT industry customer entity, an operator management device, an authentication unit, and a third-party server can be used as direct participants of the blockchain network, and can be used as nodes in the blockchain network.

Figure 6:
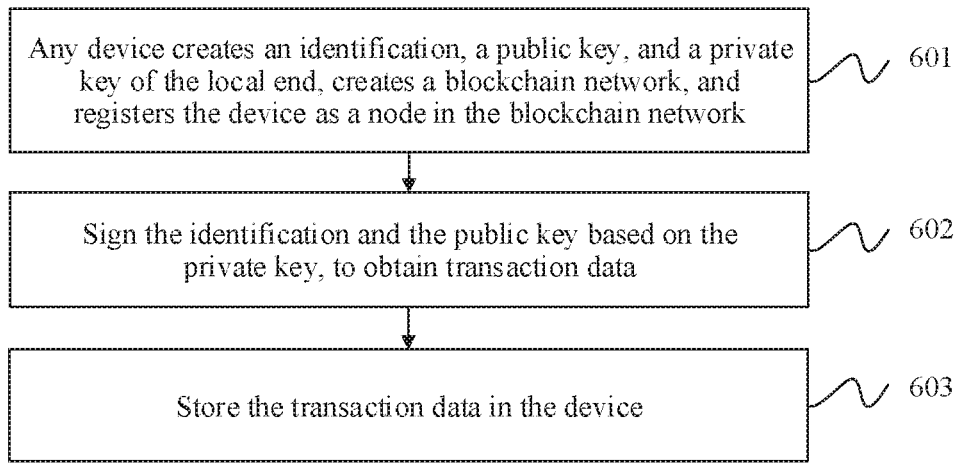
FIG. 6 is a flowchart of a blockchain network initialization method according to an embodiment of this disclosure.

FIG. 6 is a flowchart of an identity management method according to an embodiment of this disclosure. An initialization process of a blockchain network is described in this embodiment of this disclosure, and an execution body is a device for initializing the blockchain network. Referring to FIG. 6, the method includes the following steps.

601: Any device creates an identification, a public key, and a private key of the local end, creates a blockchain network, and registers the device as a node in the blockchain network.

The identification is used to uniquely determine the device, may represent an identity of the device, and may be a device number, a network address, or the like of the device. Identifications of different devices are different. An identification of each device may be allocated by an operator management device according to a preset rule, or may be generated by the local device according to the preset rule. The preset rule is set in the blockchain network. The preset rule is used to specify a rule that an identification of a node needs to comply with, for example, how to set an identification of an IoT industry customer entity or an identification of an operator management device. The preset rule may be further used to specify a rule that an identification of user equipment requesting access needs to comply with. According to the preset rule, it may be determined whether an identification requested to be registered is valid and whether verification on the identification can succeed.

The blockchain network uses an asymmetric encryption technology to implement trusted information propagation. The device may create, for the local end, the public key and the private key that are corresponding to each other. Data encrypted by using the public key can be decrypted only by using the private key, and data encrypted by using the private key can be decrypted only by using the public key. Therefore, subsequently, the public key may be open to a node in the blockchain network, and the node in the blockchain network verifies, based on the public key, data obtained after the device performs signature based on the private key.

During initialization, the device creates the blockchain network, and registers the local end as the node in the blockchain network. In this case, the device is both a control plane node and a data plane node in the blockchain network.

602: Sign the identification and the public key based on the private key, to obtain transaction data.

For example, the device creates configuration information $\{$identification $ID_O$, public key $K_O^p$, private key $K_O^s\}$, and signs $ID_O$ and $K_O^p$ based on $K_O^s$, to obtain transaction data $sig(K_O^s)\{ID_o, K_O^p\}$.

603: Store the transaction data in the device.

During the initialization, there is only one data plane node, namely, the device, in the blockchain network. Therefore, the currently registered transaction data is stored in the device.

Then, new control plane nodes and new data plane nodes may be further registered with the blockchain network. Each time a new control plane node is registered, when subsequently the transaction data is requested to be registered, the new control plane node may perform consensus calculation on the transaction data requested to be registered. Each time a new data plane node is registered, stored transaction data is written into the new data plane node, to ensure synchronization of transaction data stored in each data plane node in the blockchain network.

In a possible implementation, the preset rule is set in the blockchain network. The preset rule is used to specify a consensus algorithm that needs to be executed on the transaction data requested to be registered. Registration can succeed only after the consensus calculation is completed on the transaction data. Therefore, a control plane node may create, according to the preset rule, an identification, and a public key and a private key that are corresponding to each other. Subsequently, another control plane node added to the blockchain network performs consensus calculation on the transaction data according to the preset rule. Details are as follows.

In a first manner, when determining that the identification in the transaction data is a new identification, a control plane node in the blockchain network signs the transaction data based on a private key of the local node, and sends signature data obtained after the transaction data is signed to a next control plane node. The next control plane node continues to perform signature until consensus calculation is completed after a preset quantity of control plane nodes perform signature, or until consensus calculation is completed after a preset proportion of control plane nodes perform signature, and the transaction data and signature data obtained after the transaction data is signed are written into each data plane node in the blockchain network for storage.

The preset quantity and the preset proportion may be determined according to the preset rule. After a sufficient quantity or a sufficient proportion of control plane nodes verify that the identification is a new identification and reach a consensus, it indicates that a quantity of signatures of the identification already reaches an error tolerance capability of consensus calculation in the blockchain network. In this case, the identification can be successfully registered. The transaction data allows to be written only after the sufficient quantity or the sufficient proportion of control plane nodes reach the consensus. This ensures security and a feature of being tamper-proof of the transaction data.

For example, control plane nodes in the blockchain network include an IoT industry customer entity and a third-party server, configuration information of the IoT industry customer entity is $\{$identification $ID_v$, public key $K_V^p$, private key $K_V^s\}$, and configuration information of the third-party server is $\{$identification $ID_s$, public key $K_S^p$, private key $K_S^s\}$. Therefore, signature data obtained after the IoT industry customer entity signs transaction data is $sig(K_V^s)$ $sig(K_O^s)\{ID_o, K_o^p\}$, signature data obtained after the third-party server performs signature is $sig\{(K_S^s), (K_V^s) sig(K_O^s)\}\{ID_o, K_o^p\}$, and the transaction data $sig(K_O^s)\{ID_o, K_o^p\}$ and the signature data $sig\{(K_S^s), (K_V^s) sig(K_O^s)\}\{ID_o, K_o^p\}$ are written into each data plane node.

In a second manner, when determining that the identification in the transaction data is a new identification, a control plane node in the blockchain network calculates the transaction data according to a consensus algorithm in the preset rule, to obtain a calculation result, signs the transaction data based on a private key of the local node, and sends signature data obtained after the transaction data is signed to a next control plane node associated with an IoT industry customer entity. The next control plane node continues to perform consensus calculation and signature until consensus calculation is completed after a preset quantity of control plane nodes obtain a correct calculation result in the preset rule and perform signature, or until consensus calculation is completed after a preset proportion of control plane nodes obtain a correct calculation result in the preset rule and perform signature, and the transaction data and signature data obtained after the transaction data is signed are written into each data plane node in the blockchain network.

The preset rule may include not only the preset quantity and the preset proportion, but also the consensus algorithm. The consensus algorithm is used to determine a manner of performing consensus calculation on the transaction data, and a calculation result obtained after the consensus calculation is used as a determining result of determining whether control plane nodes reach a consensus on the transaction data. In this case, only transaction data on which consensus calculation is performed to obtain a correct calculation result can be successfully registered.

Therefore, when determining that the identification in the transaction data is a new identification, each control plane node calculates the transaction data according to the consensus algorithm, to obtain a calculation result, and performs signature based on the private key of the local end. The consensus calculation is completed only when the preset quantity of control plane nodes obtain the correct calculation result in the preset rule and perform signature, or when the preset proportion of control plane nodes obtain the correct calculation result in the preset rule and perform signature.

The preset quantity and the preset proportion may be determined according to the preset rule. A sufficient quantity or a sufficient proportion of control plane nodes verify that the identification is the new identification, and perform consensus calculation to obtain a consistent and correct calculation result, so that registration can succeed. In addition, through signature by the control plane node that performs consensus calculation, security of the transaction data can be ensured.

In this process, if some control plane nodes calculate the transaction data and obtain incorrect calculation results, it indicates that verification on the transaction data fails. Even if the control plane nodes sign the transaction data based on the private key of the local node, signature data is not considered. Therefore, it is more difficult to perform consensus calculation on forged transaction data, and security of the transaction data is ensured.

It should be noted that the foregoing device that creates the blockchain network may be included in an operator management device, an IoT industry customer entity, or another type of device.

Figure 7:
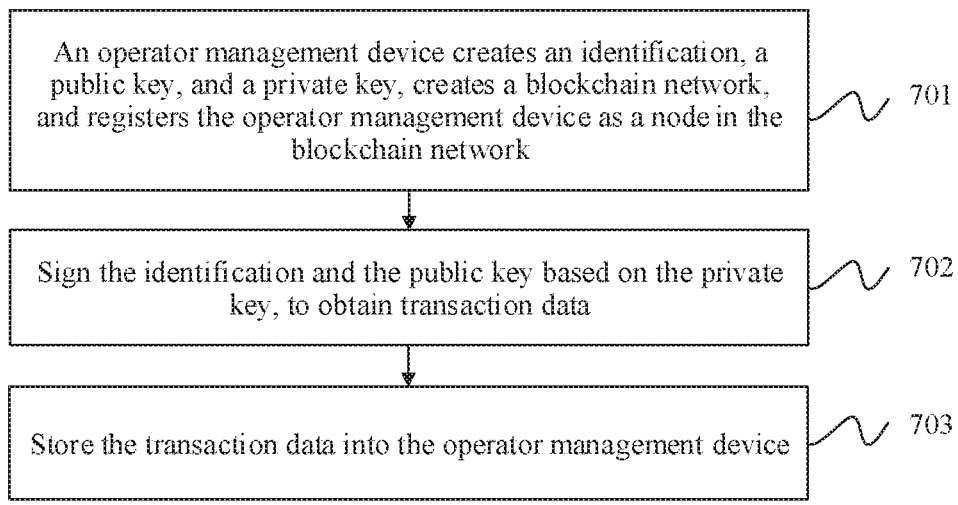
FIG. 7 is a flowchart of a blockchain network initialization method according to an embodiment of this disclosure.

For example, the device is included in an operator management device. Referring to FIG. 7, a process in which the operator management device creates a blockchain network may include the following steps.

701: The operator management device creates an identification, a public key, and a private key, creates the blockchain network, and registers the operator management device as a node in the blockchain network.

702: Sign the identification and the public key based on the private key, to obtain transaction data.

703: Store the transaction data in the operator management device.

A specific process is similar to the process in the embodiment shown in FIG. 6, and details are not described herein again.

Figure 8:
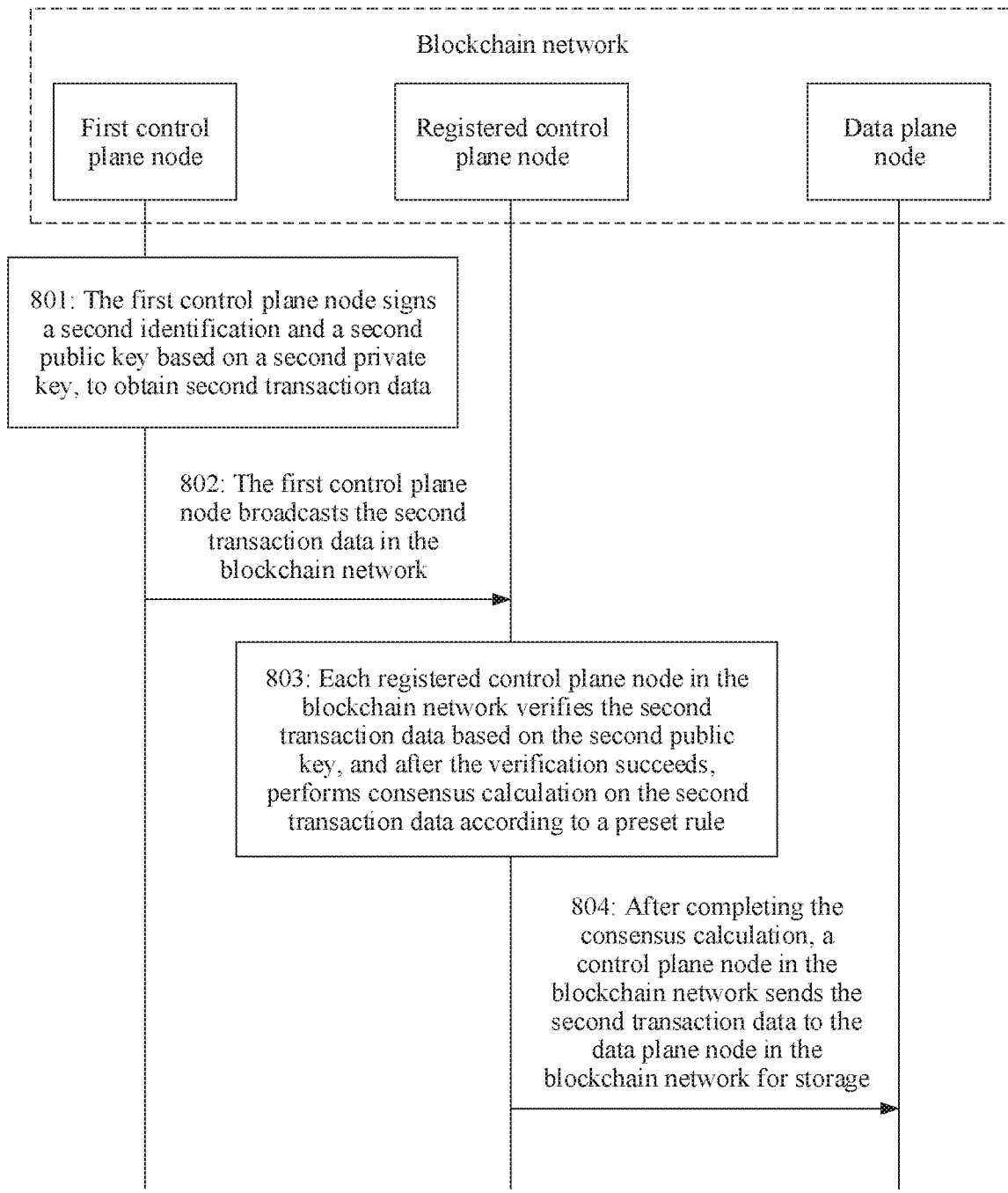
FIG. 8 is a flowchart of an identity management method according to an embodiment of this disclosure.

FIG. 8 is a flowchart of an identity management method according to an embodiment of this disclosure. An execution body of this embodiment of this disclosure is a first control plane node, and a process in which the first control plane node is registered as a node in a blockchain network is described. Referring to FIG. 8, the method includes the following steps.

801: The first control plane node signs a second identification and a second public key based on a second private key, to obtain second transaction data.

In this embodiment of this disclosure, the first control plane node is used as an example. When the first control plane node is not registered as the node in the blockchain network, the first control plane node creates the second identification, the second public key, and the second private key. The second identification is used to uniquely determine the first control plane node, is used to represent an identity of the first control plane node, and may be a device number, a network address, or the like of the first control plane node. Identifications of different control plane nodes are different. An identification of each control plane node may be allocated by an operator according to a preset rule.

The first control plane node creates, for the local end, the second public key and the second private key that are corresponding to each other. Data encrypted by using the second public key can be decrypted only by using the second private key, and data encrypted by using the second private key can be decrypted only by using the second public key. Therefore, the second public key may be open to a node in the blockchain network, and the node in the blockchain network verifies, based on the second public key, data obtained after the first control plane node performs signature based on the second private key.

802: The first control plane node broadcasts the second transaction data in the blockchain network.

By broadcasting the second transaction data, the first control plane node may send the second transaction data to another control plane node in the blockchain network. Therefore, the registered control plane node in the blockchain network performs consensus calculation on the second transaction data.

In a possible implementation, after obtaining the second transaction data, the first control plane node encapsulates the second transaction data into a second identity register message, and broadcasts the second identity register message in the blockchain network.

For example, the first control plane node creates configuration information {identification $ID_v$, public key $K_v^p$, private key $K_v^s$}; signs $ID_v$ and $K_v^p$ based on $K_v^s$, to obtain second transaction data $sig(K_v^s)\{ID_v, K_v^p\}$; encapsulates the second transaction data into a register message; and broadcasts the register message in the blockchain network.

803: Each registered control plane node in the blockchain network verifies the second transaction data based on the second public key, and after the verification succeeds, performs consensus calculation on the second transaction data according to the preset rule.

804: After completing the consensus calculation, a control plane node in the blockchain network sends the second transaction data to a data plane node in the blockchain network for storage, so that the first control plane node is registered as the node in the blockchain network.

In a possible implementation, if the first control plane node broadcasts the second identity register message in the blockchain network, another control plane node receives the second identity register message, and obtains the second transaction data after decapsulation.

For each registered control plane node in the blockchain network, after obtaining the second transaction data, the control plane node verifies the second transaction data based on the second public key, to be specific, verifies whether the second transaction data is valid data; after the verification succeeds, performs the consensus calculation on the second transaction data according to the preset rule; and after the consensus calculation is completed, sends the second transaction data to another control plane node in at least one control plane node. The second transaction data is written into the data plane node in the blockchain network until a last control plane node completes consensus calculation.

In a possible implementation, a consensus calculation process may be implemented in the following manners.

In a first manner, when determining that the identification in the second transaction data is a new identification, a control plane node signs the second transaction data based on a private key of the local node, and sends signature data obtained after the second transaction data is signed to a next control plane node. The next control plane node continues to perform signature until consensus calculation is completed after a preset quantity of control plane nodes perform signature, or until consensus calculation is completed after a preset proportion of control plane nodes perform signature, and the second transaction data and signature data obtained after the second transaction data is signed are sent by a control plane node in the blockchain network to each data plane node in the blockchain network for storage.

In a second manner, when determining that the identification in the second transaction data is a new identification, a control plane node calculates the second transaction data according to a consensus algorithm in the preset rule, to obtain a calculation result, signs the second transaction data based on a private key of the local node, and sends signature data obtained after the second transaction data is signed to a next control plane node. The next control plane node continues to perform consensus calculation and signature until consensus calculation is completed after a preset quantity of control plane nodes obtain a correct calculation result in the preset rule and perform signature, or until consensus calculation is completed after a preset proportion of control plane nodes obtain a correct calculation result in the preset rule and perform signature, and the second transaction data and signature data obtained after the second transaction data is signed are sent by a control plane node in the blockchain network to each data plane node in the blockchain network for storage.

In this case, the identification of the first control plane node is successfully registered, and the first control plane node is registered as the node in the blockchain network. For example, the first control plane node is registered as a control plane node in the blockchain network, or the first control plane node is registered as a data plane node in the blockchain network, or the first control plane node is registered as a control plane node in the blockchain network and is registered as a data plane node in the blockchain network by default.

The control plane node that sends the second transaction data and the signature data obtained after the second transaction data is signed may be a last control plane node that performs consensus calculation; or may be another control plane node in the blockchain network, for example, a control plane node configured to control writing of transaction data.

A first point that should be noted is: The blockchain network includes at least one control plane node and at least one data plane node. When the first control plane node registers the second identification, each control plane node in the blockchain network may perform consensus calculation on the second transaction data, and after consensus calculation is completed, the second transaction data is stored in each data plane node in the blockchain network. Alternatively, during actual application, for a first control plane node in any industry, control plane nodes and data plane nodes that are associated with the first control plane node may be set, and it indicates that these control plane nodes are configured to perform consensus calculation on transaction data in the industry to which the first control plane node belongs, and these data plane nodes are configured to store the transaction data in the industry to which the first control plane node belongs. Therefore, control plane nodes and data plane nodes in different industries are distinguished. In this case, the control plane node associated with the first control plane node performs consensus calculation on the transaction data in the industry to which the first control plane node belongs, and the data plane node associated with the first control plane node stores the transaction data in the industry to which the first control plane node belongs.

A second point that should be noted is: In the embodiments of this disclosure, a control plane node may be used as a data plane node, but a data plane node may be a control plane node or may not be a control plane node. In addition, the control plane node is associated with an industry, and the data plane node performs a unified storage operation and may be irrelevant to the industry. In the method provided in the embodiments of this disclosure, the control plane node and the data plane node are separated, so that each node can be prevented from performing both consensus calculation of a control plane and a storage operation of a data plane. Therefore, operation efficiency of the node is improved, and scalability and privacy are improved.

A third point that should be noted is: The first control plane node may be included in a plurality of types of devices, for example, an IoT industry customer entity, a third-party server, and an operator management device.

Figure 9:
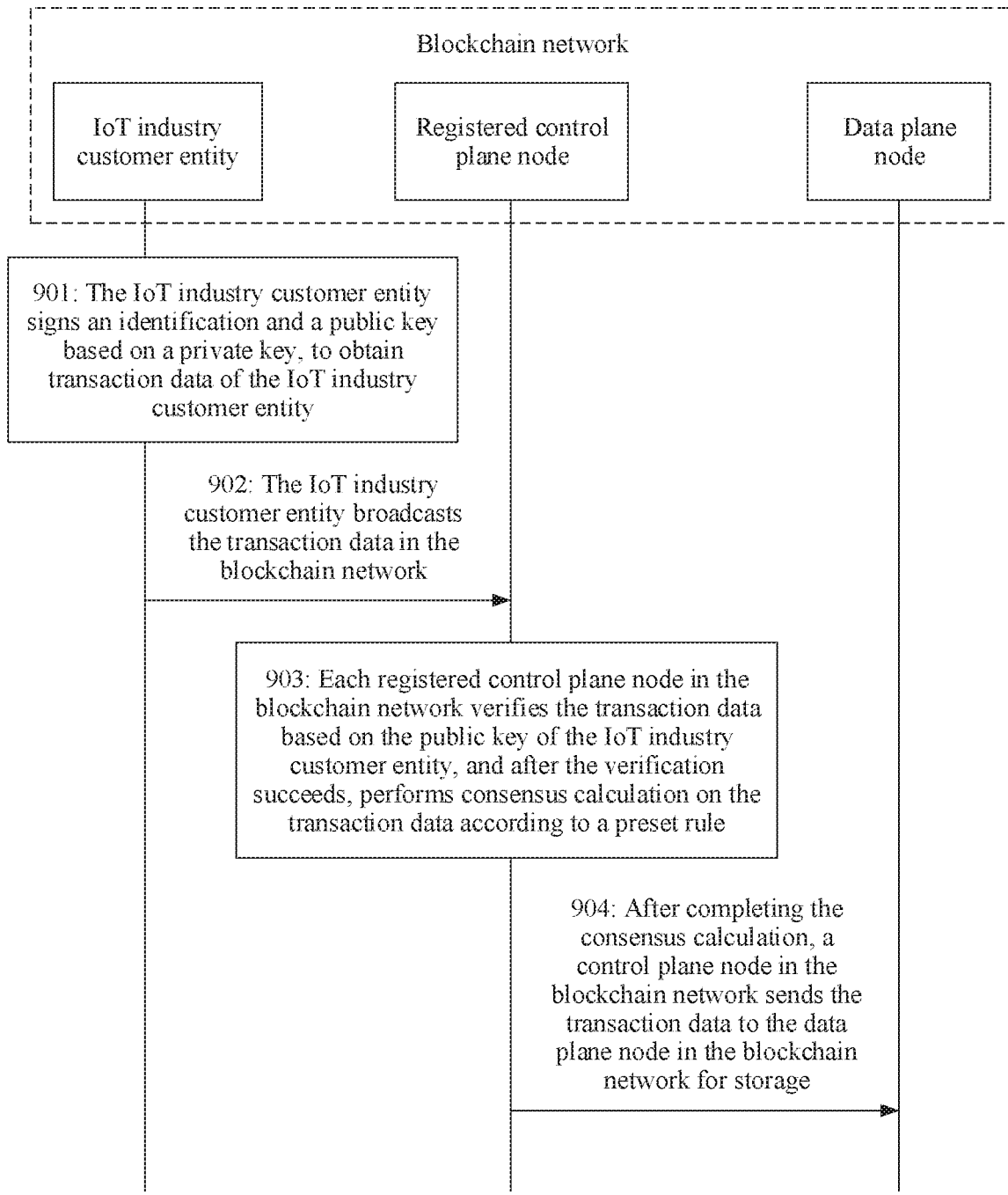
FIG. 9 is a flowchart of an identity management method according to an embodiment of this disclosure.

FIG. 9 is a flowchart of an identity management method according to an embodiment of this disclosure. In this embodiment of this disclosure, that the first control plane node is included in an IoT industry customer entity is used as an example, to describe a process in which the IoT industry customer entity is registered as a node in a blockchain network. Referring to FIG. 9, the method includes the following steps.

901: The IoT industry customer entity signs an identification and a public key based on a private key, to obtain transaction data of the IoT industry customer entity.

The identification, the public key, and the private key of the IoT industry customer entity may be generated by the IoT industry customer entity according to a preset rule, or may be allocated by an operator management device according to the preset rule.

During actual application, one IoT industry customer entity may be set for one industry, so that IoT industry customer entities of different industries may be set. An IoT industry customer entity of each industry may obtain a valid registration permission after being approved by the blockchain network, and therefore, the IoT industry customer entity can be registered with the blockchain network. The registration permission may be an electronic certificate or the like.

902: The IoT industry customer entity broadcasts the transaction data in the blockchain network.

In a possible implementation, after obtaining the transaction data, the IoT industry customer entity encapsulates the transaction data into an identity register message, and broadcasts the identity register message in the blockchain network.

903: Each registered control plane node in the blockchain network verifies the transaction data based on the public key of the IoT industry customer entity, and after the verification succeeds, performs consensus calculation on the transaction data according to the preset rule.

In a possible implementation, if the IoT industry customer entity broadcasts the identity register message in the blockchain network, a registered control plane node in the blockchain network receives the identity register message, and obtains the transaction data after decapsulation.

904: After completing the consensus calculation, a control plane node in the blockchain network sends the transaction data to a data plane node in the blockchain network for storage, so that the IoT industry customer entity is registered as the node in the blockchain network.

For example, the IoT industry customer entity is registered as a control plane node in the blockchain network, or is registered as a data plane node in the blockchain network, or is registered as both a control plane node and a data plane node in the blockchain network.

Figure 10:
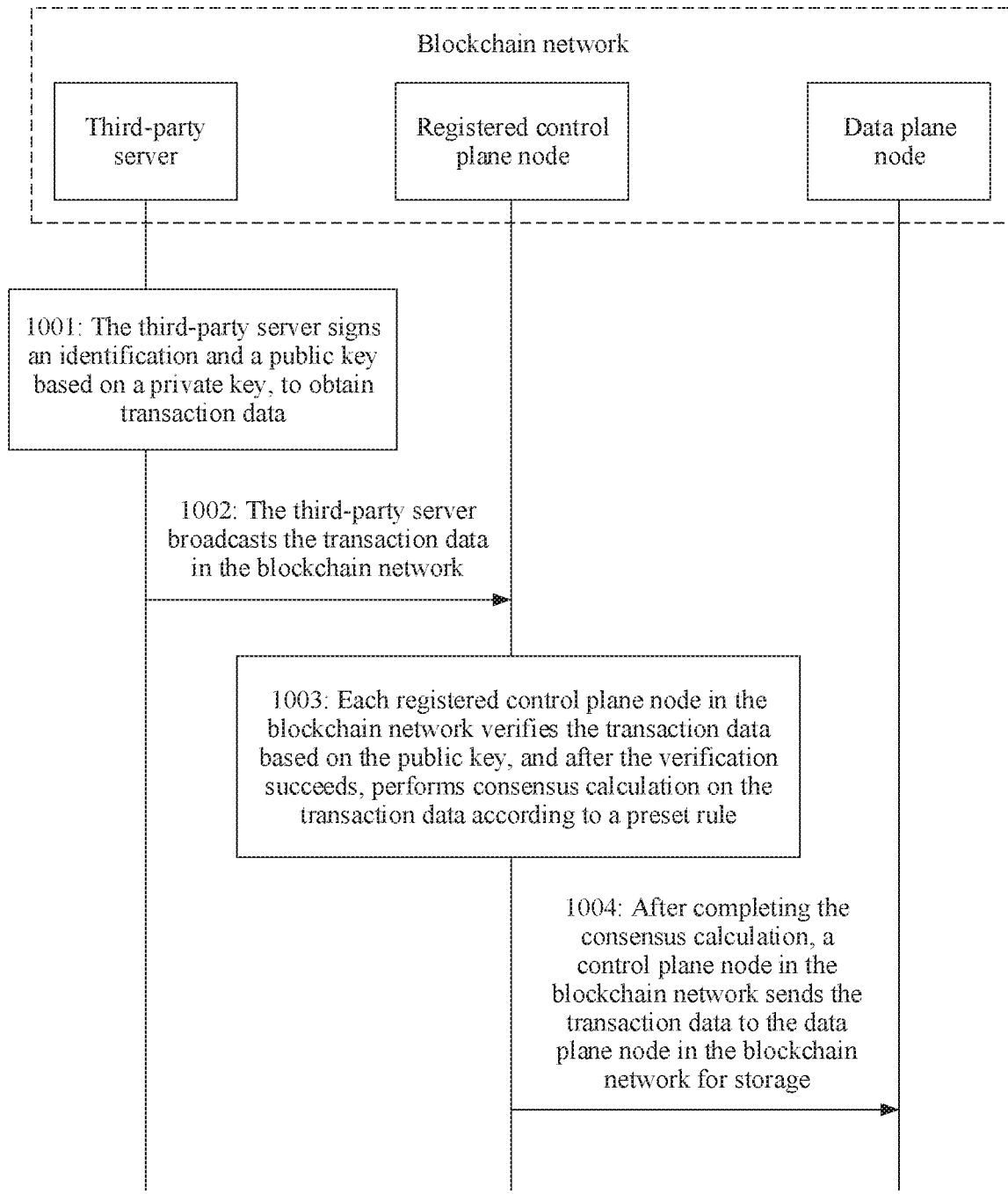
FIG. 10 is a flowchart of an identity management method according to an embodiment of this disclosure.

FIG. 10 is a flowchart of an identity management method according to an embodiment of this disclosure. In this embodiment of this disclosure, that the first control plane node is included in a third-party server is used as an example, to describe a process in which the third-party server is registered as a node in a blockchain network. Referring to FIG. 10, the method includes the following steps.

1001: The third-party server signs an identification and a public key based on a private key, to obtain transaction data. The third-party server is configured to provide a third-party function, for example, a video call function or a social function. The identification, the public key, and the private key of the third-party server may be generated by the third-party server according to a preset rule, or may be allocated by an operator management device according to the preset rule.

1002: The third-part) server broadcasts the transaction data in the blockchain network.

In a possible implementation, after obtaining the transaction data, the third-party server encapsulates the transaction data into an identity register message, and broadcasts the identity register message in the blockchain network.

For example, the third-party server creates configuration information {identification $ID_S$, public key $K_S^p$, private key $K_S^s$}; signs $ID_S$ and $K_S^p$ based on $K_S^s$, to obtain transaction data $sig(K_S^s)\{ID_S, K_S^p\}$; encapsulates the transaction data into a register message; and broadcasts the register message in the blockchain network.

1003: Each registered control plane node in the blockchain network verifies the transaction data based on the public key, and after the verification succeeds, performs consensus calculation on the transaction data according to the preset rule.

In a possible implementation, if the third-party server broadcasts the identity register message in the blockchain network, a registered control plane node in the blockchain network receives the identity register message, and obtains the transaction data after decapsulation.

1004: After completing the consensus calculation, a control plane node in the blockchain network sends the transaction data to a data plane node in the blockchain network for storage, so that the third-party server is registered as the node in the blockchain network.

For example, the third-party server is registered as a control plane node in the blockchain network, or is registered as a data plane node in the blockchain network, or is registered as both a control plane node and a data plane node in the blockchain network.

Figure 11:
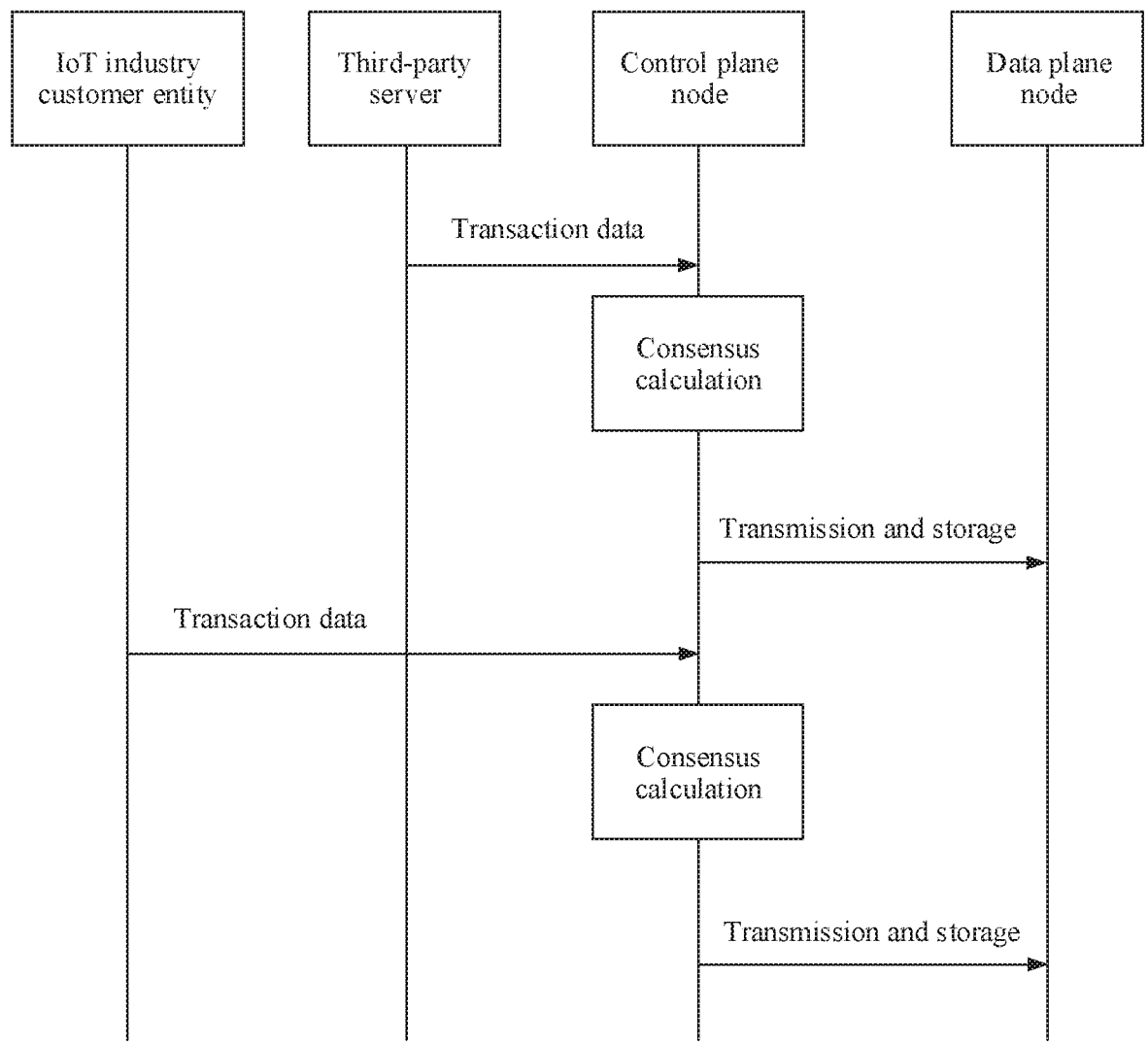
FIG. 11 is an operation flowchart of an example of an identity management method according to an embodiment of this disclosure.

An identity registration process of an IoT industry customer entity and a third-party server may be shown in FIG. 11. Referring to FIG. 11, transaction data of each node may pass consensus calculation and verification that are performed by a control plane node, and be written into a data plane node.

Figure 12:
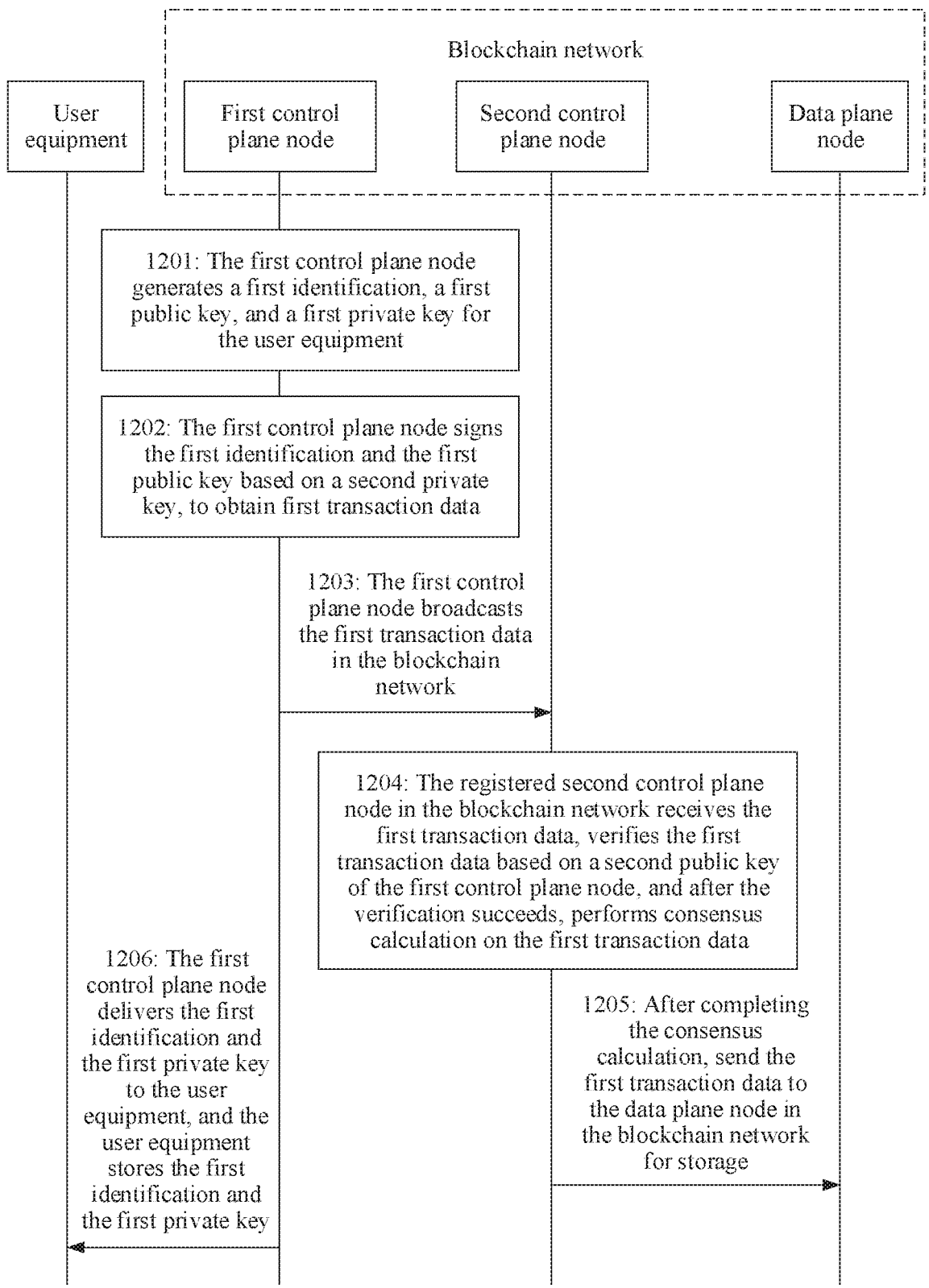
FIG. 12 is a flowchart of an identity management method according to an embodiment of this disclosure.

FIG. 12 is a flowchart of an identity management method according to an embodiment of this disclosure. In this embodiment of this disclosure, a process of registering an identification of user equipment is described. Referring to FIG. 12, the method includes the following steps.

1201: A first control plane node generates a first identification, a first public key, and a first private key for the user equipment.

The first identification is used to uniquely determine the user equipment, may represent an identity of the user equipment, and may be a device number, a user account, or the like of the user equipment. Identifications of different user equipment are different. An identification of each user equipment may be generated by the first control plane node according to a preset rule.

The first control plane node creates, for the user equipment, the first public key and the first private key that are corresponding to each other. Data encrypted by using the first public key can be decrypted only by using the first private key, and data encrypted by using the first private key can be decrypted only by using the first public key. Therefore, the first public key may be open to anode in a blockchain network, and in a process in which the user equipment interacts with the node in the blockchain network, the user equipment performs encryption based on the first private key, and the node in the blockchain network performs decryption based on the first public key.

1202: The first control plane node signs the first identification and the first public key based on a second private key, to obtain first transaction data.

1203: The first control plane node broadcasts the first transaction data in the blockchain network.

In a possible implementation, after obtaining the first transaction data, the first control plane node encapsulates the first transaction data into a first identity register message, and broadcasts the first identity register message in the blockchain network.

For example, the first control plane node creates, for the user equipment, configuration information {identification $ID_T$, public key $K_T^p$, private key $K_T^s$}; signs $ID_T$ and $K_T^p$ based on $K_T^s$, to obtain first transaction data $sig(K_T^s)\{ID_T, K_T^p\}$; encapsulates the first transaction data into a register message; and broadcasts the register message in the blockchain network.

1204: A registered second control plane node in the blockchain network receives the first transaction data, verifies the first transaction data based on a second public key of the first control plane node, and after the verification succeeds, performs consensus calculation on the first transaction data.

In a possible implementation, if the first control plane node broadcasts the first identity register message in the blockchain network, the second control plane node receives the first identity register message, and obtains the first transaction data after decapsulation.

After obtaining the first transaction data, the second control plane node verifies the first transaction data based on the second public key, to be specific, verifies whether the first transaction data is valid data; after the verification succeeds, performs the consensus calculation on the first transaction data according to the preset rule; and after completing the consensus calculation, sends the first transaction data to another control plane node in at least one control plane node. The first transaction data is written into a data plane node in the blockchain network until a last control plane node completes consensus calculation.

The second control plane node may be any control plane node, in the blockchain network, other than the first control plane node, for example, may be included in an operator management device or a third-party server.

In addition, the second control plane node may also be registered as a node in the blockchain network in a manner similar to that of the first control plane node. A registration process may include: The second control plane node signs an identification and a public key based on a private key of the local end, to obtain transaction data of the second control plane node, and broadcasts the transaction data in the blockchain network. Therefore, each registered control plane node in the blockchain network verifies the transaction data based on the public key of the second control plane node; after the verification succeeds, performs consensus calculation on the transaction data; and after completing the consensus calculation, sends the second transaction data to the data plane node in the blockchain network for storage. In this way, the second control plane node is registered as the node in the blockchain network.

1205: After completing consensus calculation, a control plane node in the blockchain network sends the first transaction data to the data plane node in the blockchain network for storage.

In a possible implementation, a consensus calculation process may be implemented in the following manners.

In a first manner, when determining that the identification in the first transaction data is a new identification, a control plane node signs the first transaction data based on a private key of the local node, and sends signature data obtained after the first transaction data is signed to a next control plane node. The next control plane node continues to perform signature until consensus calculation is completed after a preset quantity of control plane nodes perform signature, or until consensus calculation is completed after a preset proportion of control plane nodes perform signature, and the first transaction data and signature data obtained after the first transaction data is signed are sent to each data plane node in the blockchain network for storage.

In a second manner, when determining that the identification in the first transaction data is a new identification, a control plane node calculates the first transaction data according to a consensus algorithm in the preset rule, to obtain a calculation result, signs the first transaction data based on a private key of the local node, and sends signature data obtained after the first transaction data is signed to a next control plane node. The next control plane node continues to perform consensus calculation and signature until consensus calculation is completed after a preset quantity of control plane nodes obtain a correct calculation result in the preset rule and perform signature, or until consensus calculation is completed after a preset proportion of control plane nodes obtain a correct calculation result in the preset rule and perform signature, and the second transaction data and signature data obtained after the second transaction data is signed are sent to each data plane node in the blockchain network for storage.

In addition, a control plane node that sends the second transaction data and the signature data obtained after the second transaction data is signed may be a last control plane node that performs consensus calculation; or may be the first control plane node, to be specific, a last control plane node that performs consensus calculation sends the signature data obtained after the second transaction data is signed to the first control plane node, and the first control plane node sends the second transaction data and the signature data to the data plane node for storage. Alternatively, the control plane node that sends the second transaction data and the signature data obtained after the second transaction data is signed may be the second control plane node. In FIG. 12, that the control plane node that sends the second transaction data and the signature data obtained after the second transaction data is signed is the second control plane node is used as an example.

1206: The first control plane node delivers the first identification and the first private key to the user equipment, and the user equipment stores the first identification and the first private key.

After registering the identification of the user equipment with the blockchain network, the first control plane node may further deliver the first identification and the first private key to the user equipment. Subsequently, the user equipment may store the first identification and the first private key, and in a process of interacting with the blockchain network, the user equipment identifies the user equipment as user equipment by using the first identification, and encrypts interaction data based on the first private key, to ensure security of the data.

When the first identification and the first private key are delivered, the first control plane node may send the first identification and the first private key to the user equipment online, or may deliver the first identification and the first private key to the user equipment offline. For example, the first identification and the first private key are stored in a subscriber identity module (SIM) card, and after equipped with the SIM card, the user equipment may obtain the first identification and the first private key.

In addition, the foregoing embodiment is described merely by using an example in which the first control plane node registers the identification of the user equipment. In addition to the foregoing registration process, the first control plane node may further perform operations such as update and cancellation on the identification of the user equipment. Correspondingly, the first control plane node generates another piece of transaction data, and registers the transaction data with the blockchain network. For example, when updating the identification, the first control plane node may generate a piece of transaction data based on a new identification, and register the transaction data with the blockchain network. In this case, the blockchain network stores both the first transaction data and the transaction data generated subsequently, to indicate that the identification is already updated. Alternatively, when the first control plane node generates the first transaction data, a status of the identification of the user equipment is a registered state; subsequently when the verification succeeds and the first transaction data is written into the data plane node, the status of the identification of the user equipment may be changed to an authenticated state; and subsequently when the first control plane node cancels the identification of the user equipment, the first control plane node may generate a piece of transaction data and register the new transaction data with the blockchain network, where the status of the identification of the user equipment in the transaction data is changed to a canceled state. In this case, the blockchain network stores both the first transaction data and the transaction data generated subsequently, to indicate that the identification is already canceled.

In the related art, identifications of user equipment are centrally delivered by a mobile network operator and are managed in a distributed manner based on a dHSS. Consequently, costs of maintaining a connection by the mobile network operator are relatively high, and this solution is not applicable to an IoT scenario including a massive quantity of devices. In addition, an identification of user equipment is exclusive to the mobile network operator, and is not open to upstream and downstream industries in an industry chain. Consequently, for one user equipment, a plurality of independent identifications need to be registered for different operators, and extra management costs are caused. In addition, in a blockchain network, a control plane node is not decoupled from a data plane node. Consequently, each node in the blockchain network needs to perform both consensus calculation of a control plane and a storage operation of a data plane on transaction data, resulting in very low operation efficiency of each node.

In the method provided in this embodiment of this disclosure, the first control plane node generates the first identification, the first public key, and the first private key for the user equipment; signs the first identification and the first public key based on the second private key, to obtain the first transaction data of the user equipment; and broadcasts the first transaction data in the blockchain network. Therefore, the first control plane node registers the identification. This reduces maintenance costs of a management device and can be applicable to an IoT scenario. In addition, the delivered identification is not limited by the management device and may be open to management devices of a plurality of operators; and for one user equipment, there is no need to register a plurality of identifications for different operators, so that waste of unnecessary management costs is avoided and identification resources are saved. Further, the control plane node and the data plane node are separated, so that each node can be prevented from performing both consensus calculation of a control plane and a storage operation of a data plane. Therefore, operation efficiency of the node is improved.

Figure 13:
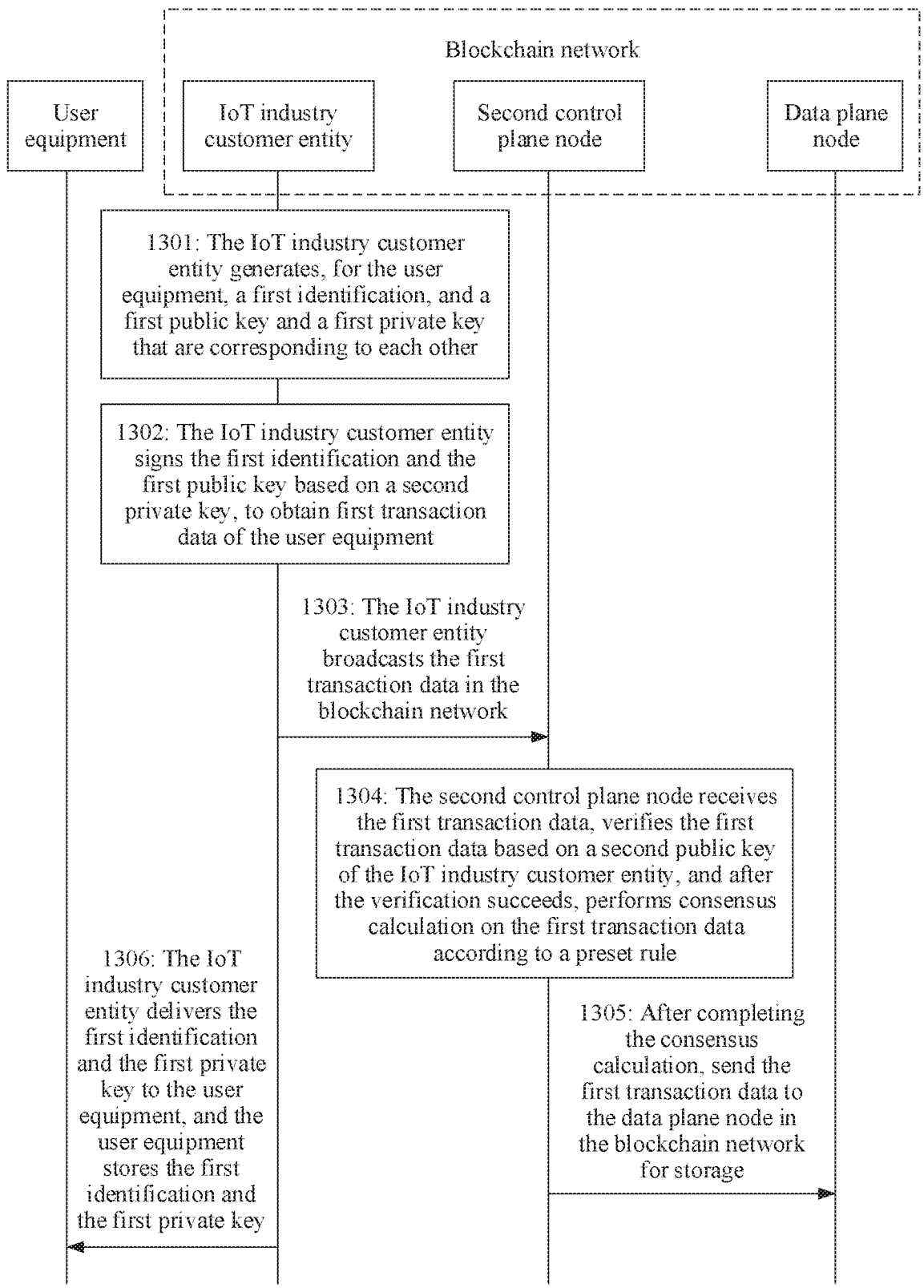
FIG. 13 is a flowchart of an identity management method according to an embodiment of this disclosure.
Figure 14:
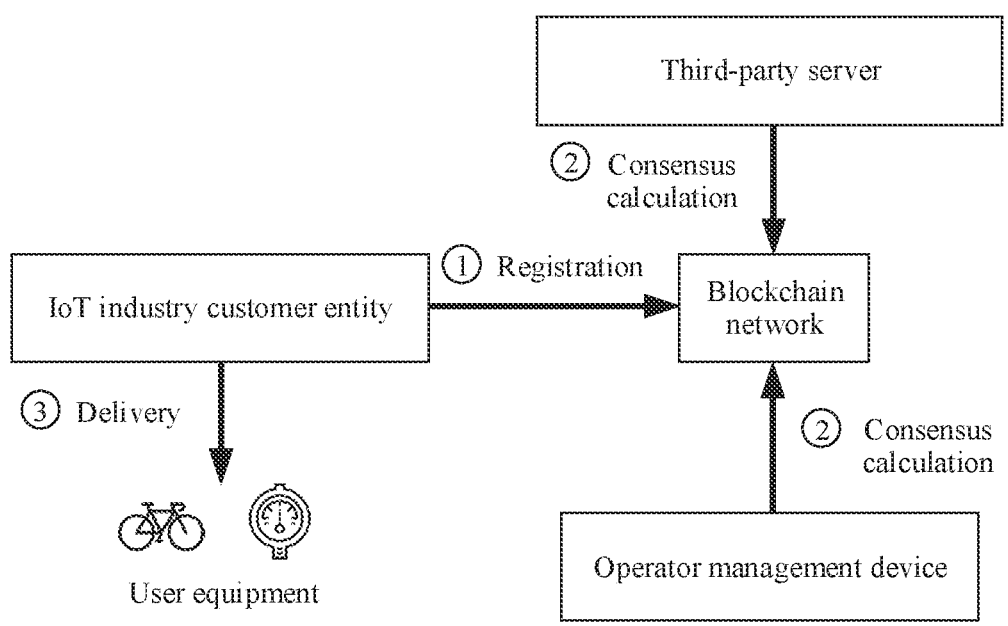
FIG. 14 is a schematic diagram of an identity management process of an IoT industry customer entity and a third-party server according to an embodiment of this disclosure.

In a possible implementation, the first control plane node may be included in an IoT industry customer entity. In other words, the IoT industry customer entity may deliver, register, and manage an identification for user equipment. FIG. 13 is a flowchart of an identity management method according to an embodiment of this disclosure. FIG. 14 is an operation flowchart of an example of an identity registration method according to an embodiment of this disclosure. In this embodiment of this disclosure, a process in which an IoT industry customer entity registers an identification for user equipment is described. Referring to FIG. 13, the method includes the following steps.

1301: The IoT industry customer entity generates, for the user equipment, a first identification, and a first public key and a first private key that are corresponding to each other.

1302: The IoT industry customer entity signs the first identification and the first public key based on a second private key, to obtain first transaction data of the user equipment.

1303: The IoT industry customer entity broadcasts the first transaction data in a blockchain network.

In a possible implementation, after obtaining the first transaction data, the IoT industry customer entity encapsulates the first transaction data into a first identity register message, and broadcasts the first identity register message in the blockchain network.

1304: A second control plane node receives the first transaction data, verifies the first transaction data based on a second public key of the IoT industry customer entity, and after the verification succeeds, performs consensus calculation on the first transaction data according to a preset rule.

In a possible implementation, if the IoT industry customer entity broadcasts the first identity register message in the blockchain network, the second control plane node receives the first identity register message, and obtains the first transaction data after decapsulation.

1305: After completing consensus calculation, a control plane node in the blockchain network sends the first transaction data to a data plane node in the blockchain network for storage.

1306: The IoT industry customer entity delivers the first identification and the first private key to the user equipment, and the user equipment stores the first identification and the first private key.

Figure 15A:
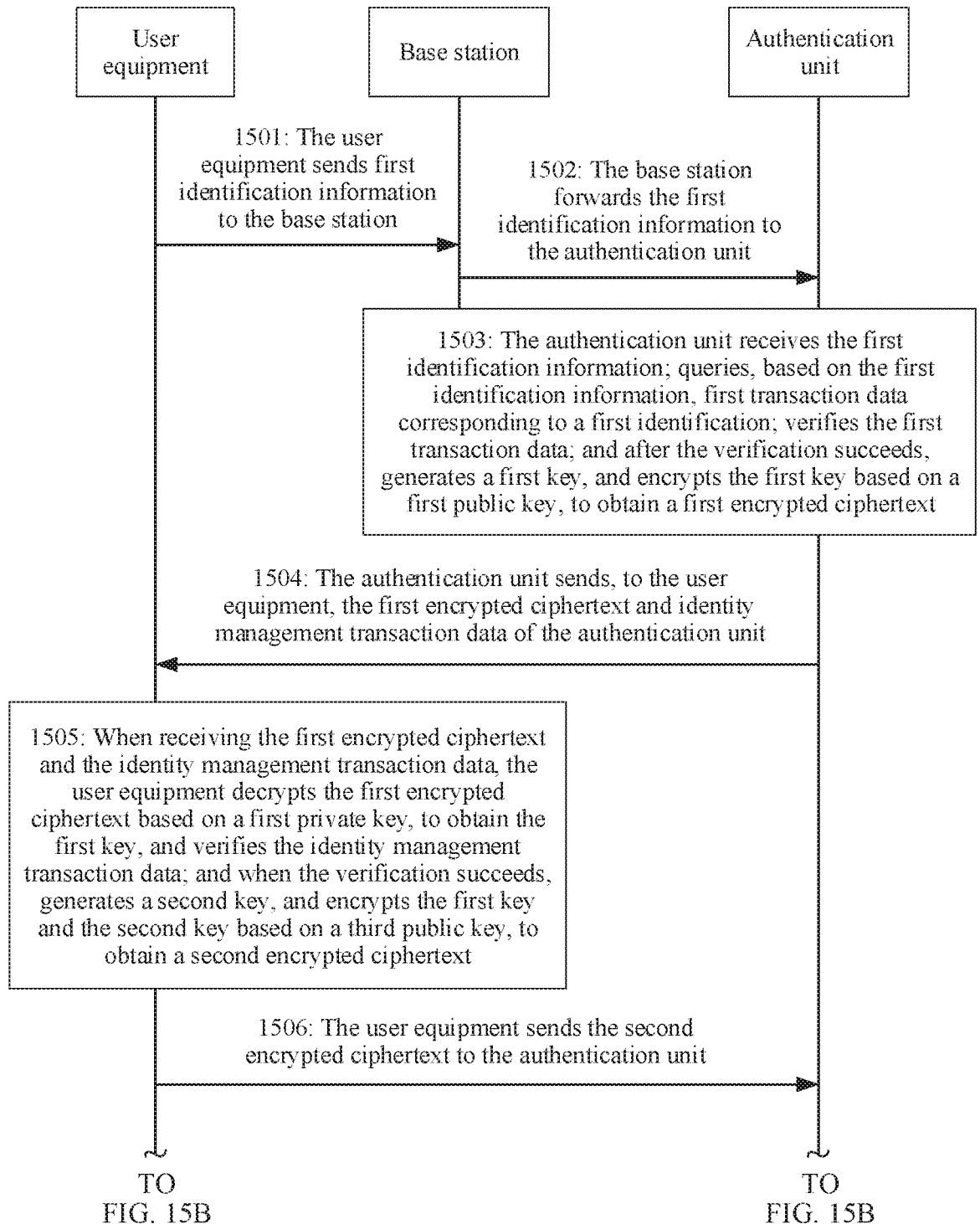
FIG. 15A and FIG. 15B are a flowchart of an authentication method according to an embodiment of this disclosure.
Figure 15B:
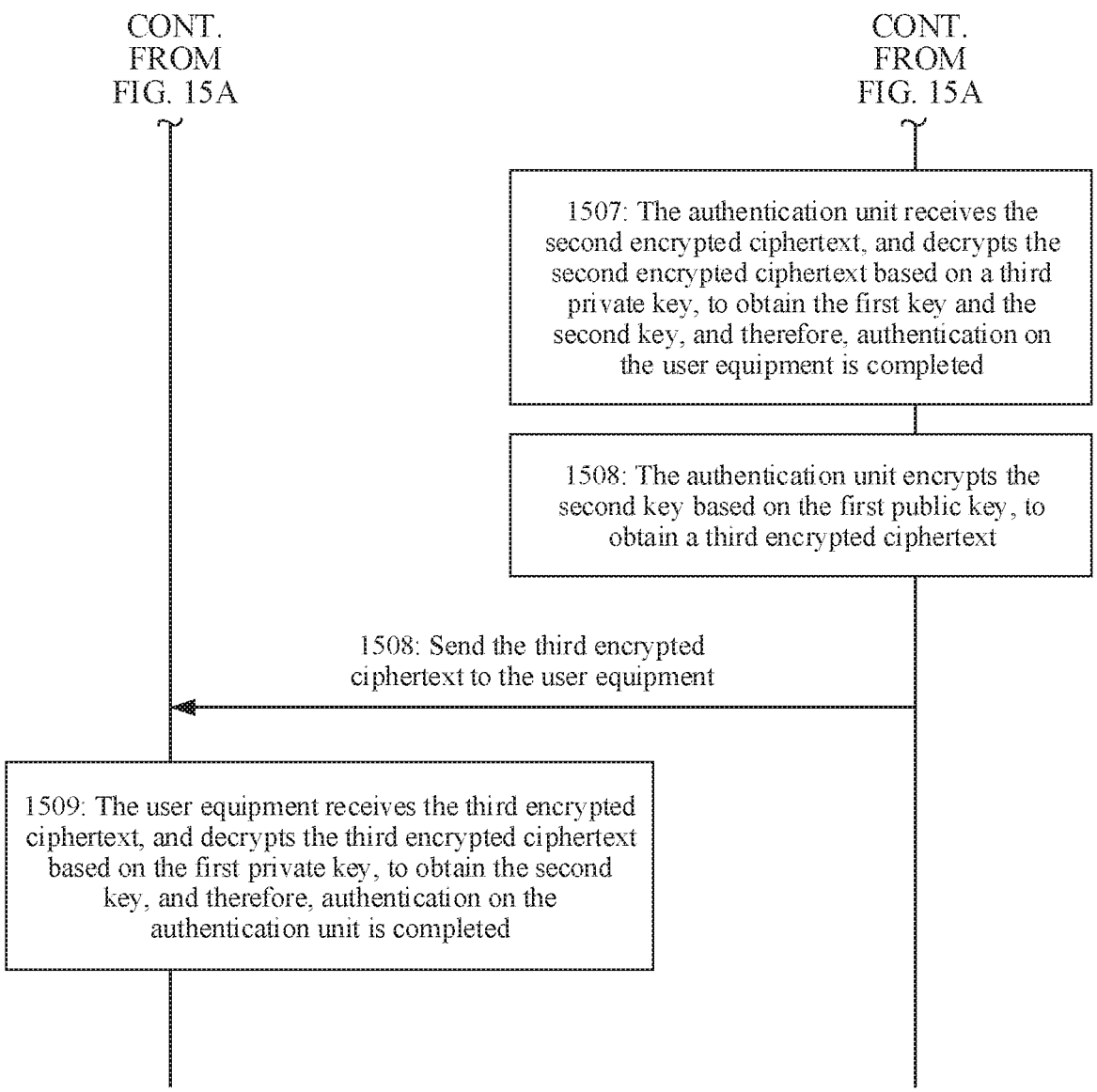

FIG. 15A and FIG. 15B are a flowchart of an authentication method according to an embodiment of this disclosure. Execution bodies of this embodiment of this disclosure are user equipment, a base station, an authentication unit, and a control plane node in a blockchain network. In this embodiment of this disclosure, a process of performing authentication on the user equipment is described. Referring to FIG. 15A and FIG. 15B, the method includes the following steps.

1501: The user equipment sends first identification information to the base station.

1502: The base station forwards the first identification information to the authentication unit.

In this embodiment of this disclosure, the authentication unit is introduced as an authentication node of the network, and the authentication unit directly interacts with the blockchain network, to implement authentication on an identity of the user equipment. The authentication unit may be implemented in a form of an independent hardware network element, a software function module, or the like. In addition, a deployment position of the authentication unit is very flexible, and the authentication unit may be deployed in an access network or a core network based on a requirement.

To enable the user equipment to access a network of a mobile network operator, a first identification of the user equipment is registered with the blockchain network, and first transaction data may be stored after consensus calculation is completed in the blockchain network. Subsequently, when the user equipment accesses the network of the mobile network operator, the user equipment initiates the first identification information to a base station of the mobile network operator. In this case, the base station does not need to perform authentication, and only needs to forward the first identification information to the authentication unit.

In another embodiment, the user equipment may alternatively send the first identification information to the authentication unit via another network element, and the another network element is not limited to the base station.

1503: The authentication unit receives the first identification information; queries, based on the first identification information, the first transaction data corresponding to the first identification; verifies the first transaction data; and after the verification succeeds, generates a first key, and encrypts the first key based on a first public key, to obtain a first encrypted ciphertext.

1504: The authentication unit sends, to the user equipment, the first encrypted ciphertext and identity management transaction data that is of the authentication unit.

In this embodiment of this disclosure, a control plane node in the blockchain network may configure a third identification, a third public key, and a third private key for the authentication unit. The third identification is used to uniquely determine the authentication unit, may represent an identity of the authentication unit, and may be a device number, a network address, or the like of the authentication unit. Identifications of different authentication units are different. An identification of each authentication unit may be allocated according to a preset rule. Data encrypted by using the third public key can be decrypted only by using the third private key, and data encrypted by using the third private key can be decrypted only by using the third public key. Therefore, subsequently, the third public key may be open to a node in the blockchain network, and the node in the blockchain network verifies, based on the third public key, data obtained after the authentication unit performs signature based on the third private key.

After the third identification, the third public key, and the third private key are configured, a management device signs the third identification and the third public key based on a private key of the local end, to obtain the identity management transaction data of the authentication unit, and registers the identity management transaction data with the blockchain network. A registration process is similar to a process of registering the first transaction data, and details are not described herein again. In addition, the management device delivers the identity management transaction data to the authentication unit, and the authentication unit stores the identity management transaction data. A delivery process may be performed online or offline.

When receiving the first identification information sent by the user equipment, the authentication unit determines the first identification based on the first identification information. The first identification information may be the first identification, or may be an identifier used to identify the first identification. The first identification may be determined based on the first identification information. Then, the first transaction data corresponding to the first identification may be first queried from locally stored transaction data. If the first transaction data is successfully found, subsequent steps continue to be performed, or if the locally stored transaction data does not include the first transaction data corresponding to the first identification, the authentication unit queries, from the blockchain network, the first transaction data corresponding to the first identification, to obtain the first transaction data corresponding to the first identification. For example, the authentication unit may query from a control plane node in the blockchain network, and the control plane node sends the first transaction data corresponding to the first identification to the authentication unit, or sends a query failure message to the authentication unit when the first transaction data cannot be found.

After obtaining the first transaction data, the authentication unit verifies the first transaction data based on a public key of the operator management device. If the verification succeeds, it indicates that the first transaction data already passes verification of the operator management device and already obtains a signature of the operator management device. In this case, the authentication unit determines that the verification succeeds. After the verification succeeds, the first key is generated. Subsequently, the first key may be used for protection in an air interface communication process of the user equipment. For example, the first key is used to perform data integrity protection in an air interface communication process between the base station and the user equipment. Then, the first key is encrypted based on the first public key, to obtain the first encrypted ciphertext, and the first encrypted ciphertext and the identity management transaction data are sent to the user equipment. The first public key may be delivered by the operator management device to the authentication unit.

In another embodiment, if the verification implemented by the authentication unit on the first transaction data fails, it is determined that the authentication fails.

1505: When receiving the first encrypted ciphertext and the identity management transaction data, the user equipment decrypts the first encrypted ciphertext based on a first private key, to obtain the first key, and verifies the identity management transaction data; and when the verification succeeds, generates a second key, and encrypts the first key and the second key based on the third public key, to obtain a second encrypted ciphertext.

The user equipment decrypts the first encrypted ciphertext based on the first private key, and verifies the identity management transaction data based on the public key of the operator management device. If the first key is obtained through decryption, it indicates that the authentication unit already obtains the correct first public key and the authentication unit already passes authentication of the management device. If the verification on the identity management transaction data succeeds, it indicates that the identity of the authentication unit also passes authentication of the operator management device. In this case, the user equipment generates the second key, and subsequently the second key may be used for protection in an air interface communication process of the user equipment. For example, the second key may be used for encryption protection on data in an air interface communication process between the base station and the user equipment. The user equipment encrypts the first key and the second key based on the third public key, to obtain the second encrypted ciphertext, and the second encrypted ciphertext is used for authentication on the user equipment.

In another embodiment, when the identity management transaction data is verified, if the verification fails, the authentication fails, and the user equipment reselects a new network for access.

1506: The user equipment sends the second encrypted ciphertext to the authentication unit.

1507: The authentication unit receives the second encrypted ciphertext, and decrypts the second encrypted ciphertext based on the third private key, to obtain the first key and the second key, and therefore, the authentication on the user equipment is completed.

After successfully decrypting the second encrypted ciphertext based on the third private key, the authentication unit obtains the first key and the second key. In this case, it is determined that the first key provided by the user equipment is the same as the first key generated by the authentication unit, so that the authentication on the user equipment succeeds.

1508: The authentication unit encrypts the second key based on the first public key, to obtain a third encrypted ciphertext, and sends the third encrypted ciphertext to the user equipment.

1509: The user equipment receives the third encrypted ciphertext, and decrypts the third encrypted ciphertext based on the first private key, to obtain the second key, and therefore, authentication on the authentication unit is completed.

The third encrypted ciphertext is to be used for the authentication on the authentication unit. After successfully decrypting the third encrypted ciphertext based on the first private key, the user equipment obtains the second key. In this case, it is determined that the second key provided by the authentication unit and the second key generated by the user equipment are the same, so that the authentication on the authentication unit succeeds. In this case, a mutual authentication process between the user equipment and the authentication unit is completed.

In the related art, when accessing a network, user equipment needs to interact with a core network to complete a series of authentication operations, which causes severe control signaling load. Especially, when a massive quantity of IoT devices access the network, control signaling load becomes more severe. In addition, when mutual authentication is performed between a base station and the user equipment, the base station further needs to support a new authentication mechanism. Consequently, it is difficult to improve the base station. However, in the method provided in this embodiment of this disclosure, through deployment of the authentication unit, the authentication unit and the user equipment implement mutual authentication, and the user equipment does not need to perform excessive interaction with a core network. This avoids bringing severe control signaling load to the core network and improves network performance. In addition, a base station does not need to be improved, so that an implementation difficulty is relatively small.

Figure 16:
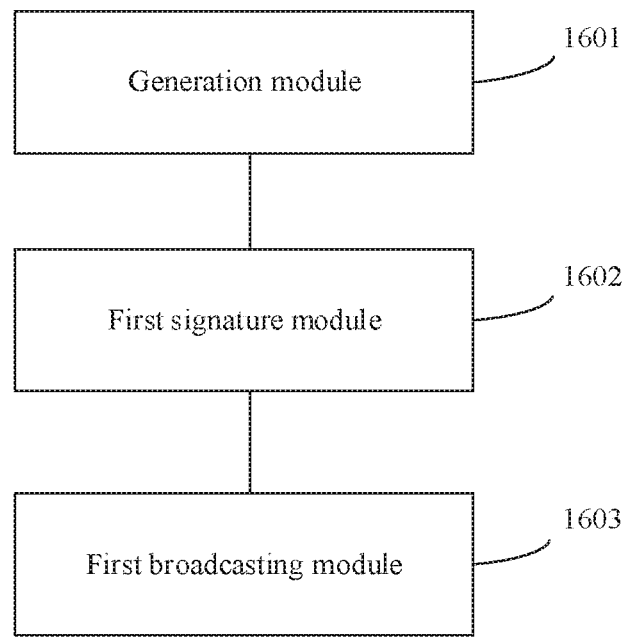
FIG. 16 is a schematic structural diagram of a control plane node according to an embodiment of this disclosure.

FIG. 16 is a schematic structural diagram of a control plane node according to an embodiment of this disclosure. Referring to FIG. 16, the control plane node is applied to the communications network shown in the foregoing embodiments, and the control plane node includes:

a generation module 1601, configured to generate a first identification, a first public key, and a first private key for user equipment; a first signature module 1602, configured to sign the first identification and the first public key based on a second private key of the control plane node, to obtain first transaction data; and a first broadcasting module 1603, configured to broadcast the first transaction data in a blockchain network, where the first transaction data is to be used for consensus calculation in the blockchain network.

In a first possible implementation, the control plane node further includes: a sending module, configured to send the first transaction data and signature data generated through the consensus calculation to at least one data plane node for storage.

In a second possible implementation, the control plane node further includes: a second signature module, configured to sign a second identification and a second public key of the control plane node based on the second private key, to obtain second transaction data; and a second broadcasting module, configured to broadcast the second transaction data in the blockchain network, where the second transaction data is to be used to register the control plane node as a node in the blockchain network.

In a third possible implementation, the control plane node is included in an internet of things IoT industry customer entity.

Figure 17:
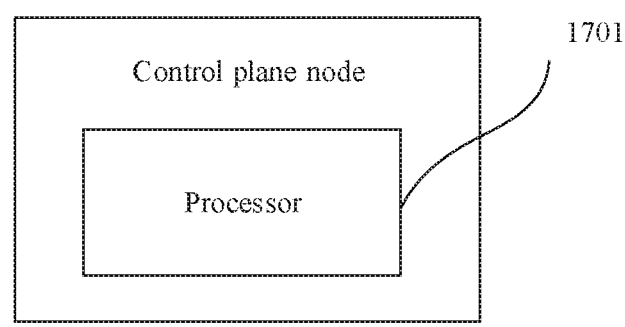
FIG. 17 is a schematic structural diagram of another control plane node according to an embodiment of this disclosure.

FIG. 17 is a schematic structural diagram of a control plane node according to an embodiment of this disclosure. Referring to FIG. 17, the control plane node is applied to the communications network shown in the foregoing embodiments, and the control plane node includes a processor 1701. The processor 1701 is coupled to a memory, the memory stores at least one instruction, and the processor 1701 is configured to invoke the instruction, to perform an operation performed by the first control plane node in the foregoing embodiments.

In a possible implementation, the control plane node includes a processor, a memory, and a transmitter, and the transmitter is configured to perform a step of broadcasting first transaction data or second transaction data.

Figure 18:
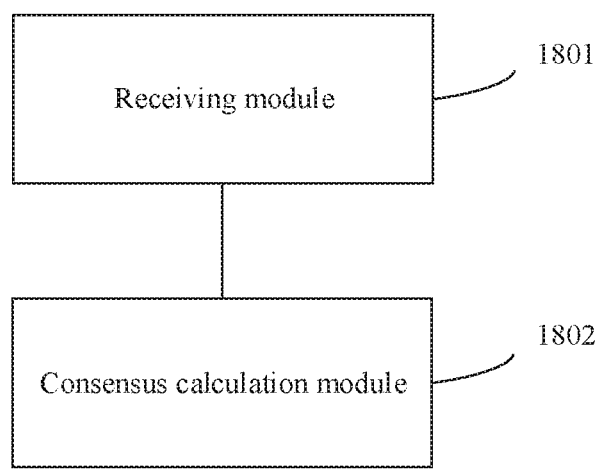
FIG. 18 is a schematic structural diagram of a control plane node according to an embodiment of this disclosure.

FIG. 18 is a schematic structural diagram of a control plane node according to an embodiment of this disclosure. Referring to FIG. 18, the control plane node is applied to the communications network shown in the foregoing embodiments, and the control plane node includes:

a receiving module 1801, configured to receive first transaction data, where the first transaction data is obtained after a first identification and a first public key of user equipment are signed based on a second private key of a first control plane node other than the control plane node; and a consensus calculation module 1802, configured to: verify the first transaction data based on a second public key of the first control plane node, and after the verification succeeds, perform consensus calculation on the first transaction data.

In a first possible implementation, the consensus calculation module 1802 is further configured to: when determining that the first identification in the first transaction data is a new identification, sign the first transaction data based on a private key of the control plane node, and send signature data obtained after the first transaction data is signed to another control plane node in at least one control plane node or at least one data plane node.

In a second possible implementation, the control plane node further includes: a sending module, configured to send the first transaction data and signature data generated through the consensus calculation to the at least one data plane node for storage.

In a third possible implementation, the control plane node further includes: a signature module, configured to: configure a third identification, a third public key, and a third private key for an authentication unit; and sign the third identification and the third public key based on the private key of the control plane node, to obtain identity management transaction data of the authentication unit; and the sending module is configured to send the identity management transaction data to the authentication unit, where the control plane node is included in an operator management device of the communications network.

In a fourth possible implementation, the control plane node is included in the operator management device or a third-party server of the communications network.

Figure 19:
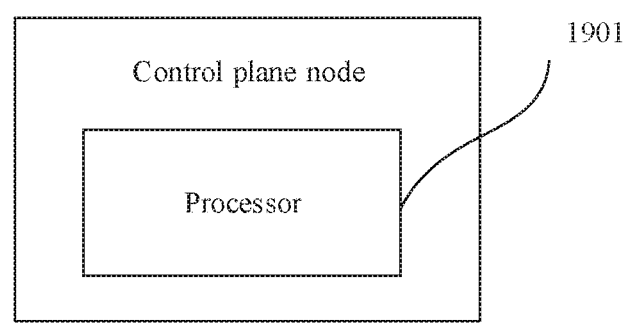
FIG. 19 is a schematic structural diagram of another control plane node according to an embodiment of this disclosure.

FIG. 19 is a schematic structural diagram of a control plane node according to an embodiment of this disclosure. Referring to FIG. 19, the control plane node is applied to the communications network shown in the foregoing embodiments, and the control plane node includes a processor 1901. The processor 1901 is coupled to a memory, the memory stores at least one instruction, and the processor 1901 is configured to invoke the instruction, to perform an operation performed by the second control plane node in the foregoing embodiments.

In a possible implementation, the control plane node includes a processor, a memory, and a receiver, the receiver is configured to perform a step of receiving first transaction data, and a transmitter is configured to perform steps of sending the transaction data and signature data and sending identity management transaction data of an authentication unit.

Figure 20:
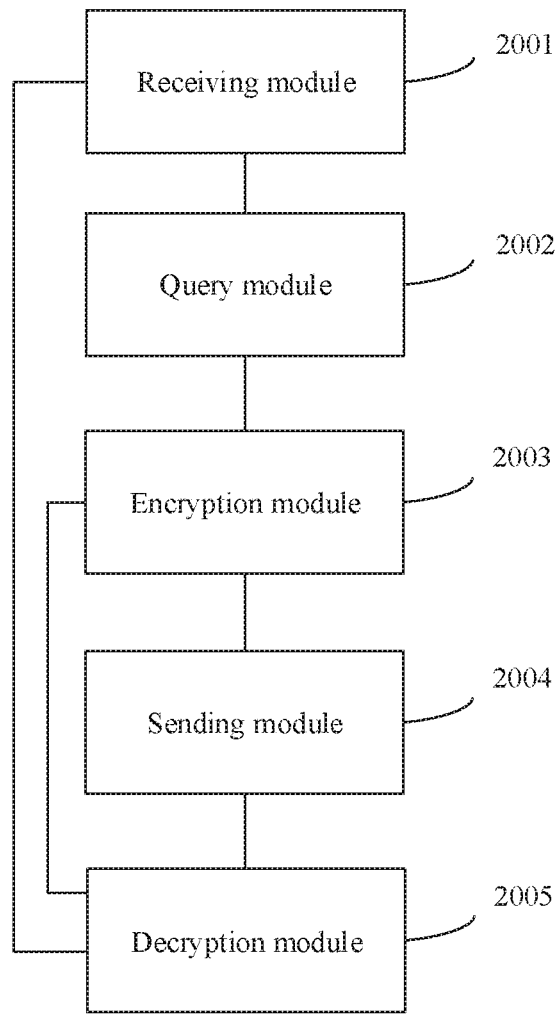
FIG. 20 is a schematic structural diagram of an authentication unit according to an embodiment of this disclosure.

FIG. 20 is a schematic structural diagram of an authentication unit according to an embodiment of this disclosure. Referring to FIG. 20, the authentication unit is applied to the communications network shown in the foregoing embodiments, and the authentication unit includes:

a receiving module 2001, configured to receive first identification information sent by user equipment; a query module 2002, configured to query, based on the first identification information, first transaction data corresponding to a first identification; an encryption module 2003, configured to: verify the first transaction data; and after the verification succeeds, generate a first key, and encrypt the first key based on a first public key of the user equipment, to obtain a first encrypted ciphertext; a sending module 2004, configured to send, to the user equipment, the first encrypted ciphertext and identity management transaction data that is of the authentication unit, where the receiving module 2001 is further configured to receive a second encrypted ciphertext sent by the user equipment, where the second encrypted ciphertext includes the first key and a second key, and is to be used for authentication on the user equipment; and a decryption module 2005, configured to decrypt the second encrypted ciphertext based on a third private key of the authentication unit, to obtain the first key and the second key, where the encryption module 2003 is further configured to: encrypt the second key based on the first public key, to obtain a third encrypted ciphertext; and send the third encrypted ciphertext to the user equipment, where the third encrypted ciphertext is to be used for authentication on the authentication unit.

Figure 21:
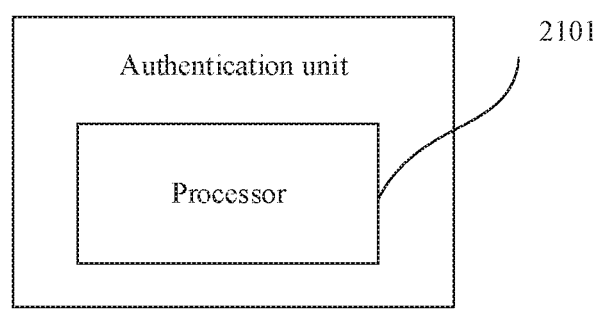
FIG. 21 is a schematic structural diagram of another authentication unit according to an embodiment of this disclosure.

FIG. 21 is a schematic structural diagram of an authentication unit according to an embodiment of this disclosure. Referring to FIG. 21, the authentication unit is applied to the communications network shown in the foregoing embodiments, and the authentication unit includes a processor 2101. The processor 2101 is coupled to a memory, the memory stores at least one instruction, and the processor 2101 is configured to invoke the instruction, to perform an operation performed by the authentication unit in the foregoing embodiments.

In a possible implementation, the authentication unit includes a processor, a memory, and a receiver, the receiver is configured to perform a receiving step, and a transmitter is configured to perform a sending step.

Figure 22:
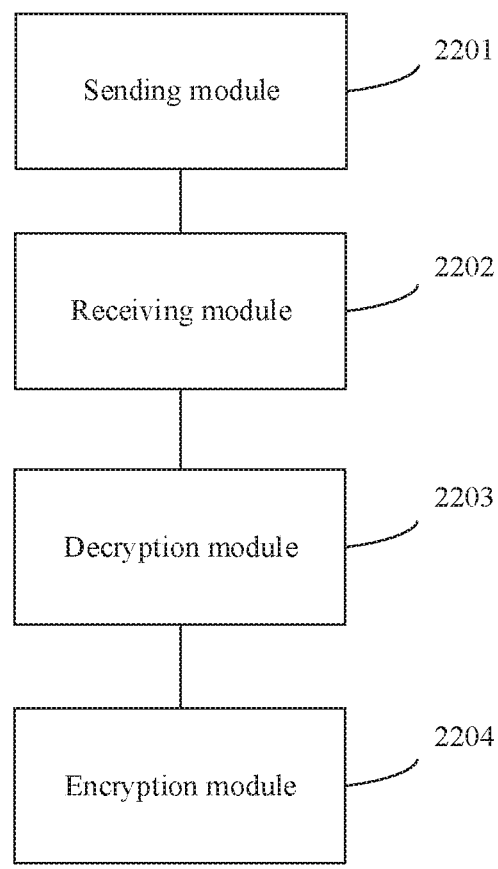
FIG. 22 is a schematic structural diagram of a communications apparatus according to an embodiment of this disclosure.

FIG. 22 is a schematic structural diagram of a communications apparatus according to an embodiment of this disclosure. Referring to FIG. 22, the communications apparatus includes:

a sending module 2201, configured to send first identification information to an authentication unit; a receiving module 2202, configured to receive a first encrypted ciphertext and identity management transaction data that is of the authentication unit that are sent by the authentication unit; a decryption module 2203, configured to: decrypt the first encrypted ciphertext based on a first private key, to obtain a first key; and verify the identity management transaction data, and if the verification succeeds, generate a second key; and an encryption module 2204, configured to: encrypt the first key and the second key based on a third public key of the authentication unit, to obtain a second encrypted ciphertext, and send the second encrypted ciphertext to the authentication unit, where the receiving module 2202 is further configured to receive a third encrypted ciphertext sent by the authentication unit, and the decryption module 2203 is further configured to decrypt the third encrypted ciphertext based on the first private key, to obtain the second key.

The communications apparatus may be user equipment, or may be a chip system, a software and hardware function module, or the like that is configured to implement the foregoing functions.

Figure 23:
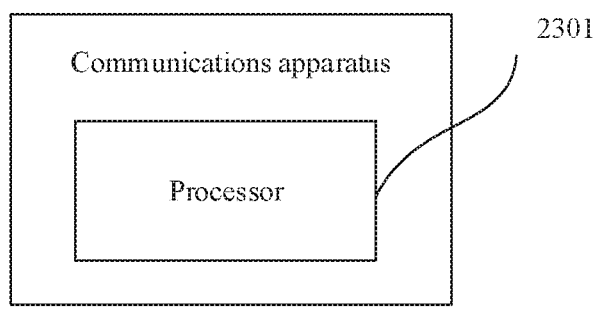
FIG. 23 is a schematic structural diagram of another communications apparatus according to an embodiment of this disclosure.

FIG. 23 is a schematic structural diagram of a communications apparatus according to an embodiment of this disclosure. Referring to FIG. 23, the communications apparatus is applied to the communications network shown in the foregoing embodiments, and the communications apparatus includes a processor 2301. The processor 2301 is coupled to a memory, the memory stores at least one instruction, and the processor 2301 is configured to invoke the instruction, to perform an operation performed by the user equipment in the foregoing embodiments.

In a possible implementation, the communications apparatus includes a processor, a memory, and a receiver, the receiver is configured to perform a receiving step, and a transmitter is configured to perform a sending step.

An embodiment of this disclosure further provides a computer-readable storage medium. The computer-readable storage medium stores at least one instruction; and when the computer-readable storage medium is run on a computer, the computer is enabled to perform an operation performed by the control plane node in the foregoing embodiments; or the computer is enabled to perform an operation performed by the authentication unit in the foregoing embodiments; or the computer is enabled to perform an operation performed by the user equipment in the foregoing embodiments.

An embodiment of this disclosure further provides a computer program product. The computer program product includes at least one instruction; and when the computer program product is run on a computer, the computer is enabled to perform an operation performed by the control plane node in the foregoing embodiments; or the computer is enabled to perform an operation performed by the authentication unit in the foregoing embodiments; or the computer is enabled to perform an operation performed by the user equipment in the foregoing embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely optional embodiments of this disclosure, but are not intended to limit this disclosure. Any modification, equivalent replacement, or improvement made without departing from the spirit and principle of this disclosure shall fall within the protection scope of this disclosure.

What is claimed is:

1. An identity management method, applied to a communications network, wherein the communications network comprises user equipment and a blockchain network, the blockchain network comprises at least one control plane node and at least one data plane node, wherein the at least one control plane node comprises a first control plane node and a second control plane node, and the method comprises:

receiving, by the second control plane node in the at least one control plane node, first transaction data, wherein the first transaction data is broadcasted by the first control plane node, the first control plane node is an internet of things (IOT) industry customer entity node that generates identifications for a plurality of user equipment in the communications network, the first transaction data comprise a first identification of the user equipment and a first public key of the user equipment that are signed with a second private key of the first control plane node, and the second control plane node is an operator management device of the communications network;

verifying, by the second control plane node, the first transaction data based on a second public key of the first control plane node;

after the verification succeeds, performing, by the second control plane node, consensus calculation on the first transaction data; and wherein the communications network further comprises an authentication unit, and the method further comprises:

receiving, by the authentication unit, first identification information sent by the user equipment;

querying, by the authentication unit based on the first identification information, the first transaction data corresponding to the first identification;

verifying, by the authentication unit, the first transaction data;

after the verification succeeds:

generating, by the authentication unit, a first key; and encrypting, by the authentication unit, the first key based on the first public key, to obtain a first encrypted ciphertext;

sending, by the authentication unit to the user equipment, the first encrypted ciphertext and identity management transaction data that is of the authentication unit;

receiving, by the authentication unit, a second encrypted ciphertext sent by the user equipment, wherein the second encrypted ciphertext comprises the first key and a second key, and wherein authentication on the user equipment uses the second encrypted ciphertext;

decrypting, by the authentication unit, the second encrypted ciphertext based on a third private key of the authentication unit, to obtain the first key and the second key;

encrypting, by the authentication unit, the second key based on the first public key, to obtain a third encrypted ciphertext; and sending, by the authentication unit, the third encrypted ciphertext to the user equipment, wherein authentication on the authentication unit uses the third encrypted ciphertext.

2. The method according to claim 1, wherein the method further comprises:

in response to the second control plane node determining that the first identification in the first transaction data is a new identification:

signing the first transaction data based on a private key of the second control plane node; and sending signature data obtained after the first transaction data is signed to another control plane node in the at least one control plane node or the at least one data plane node.

3. The method according to claim 1, wherein the method further comprises:

sending, by the second control plane node in the at least one control plane node, the first transaction data and signature data generated through consensus calculation to the at least one data plane node.

4. The method according to claim 1, wherein the method further comprises:

signing, by the first control plane node, a second identification and the second public key of the first control plane node based on the second private key, to obtain second transaction data; and broadcasting, by the first control plane node, the second transaction data in the blockchain network, wherein the first control plane node is registered as a node in the blockchain network by using the second transaction data.

5. The method according to claim 1, wherein the method further comprises:

sending, by the user equipment, the first identification information to the authentication unit;

receiving, by the user equipment, the first encrypted ciphertext and the identity management transaction data that is of the authentication unit that are sent by the authentication unit;

decrypting, by the user equipment, the first encrypted ciphertext based on a first private key of the user equipment, to obtain the first key;

verifying, by the user equipment, the identity management transaction data;

if the verification succeeds, generating, by the user equipment, the second key;

encrypting, by the user equipment, the first key and the second key based on a third public key of the authentication unit, to obtain the second encrypted ciphertext;

sending, by the user equipment, the second encrypted ciphertext to the authentication unit;

receiving, by the user equipment, the third encrypted ciphertext sent by the authentication unit; and decrypting, by the user equipment, the third encrypted ciphertext based on the first private key, to obtain the second key.

6. The method according to claim 5, wherein the method further comprises:

configuring, by a third control plane node in the at least one control plane node, a third identification, the third public key, and the third private key for the authentication unit;

signing, by the third control plane node, the third identification and the third public key based on a private key of the control plane node, to obtain the identity management transaction data of the authentication unit; and sending, by the third control plane node, the identity management transaction data to the authentication unit.

7. A communications network, wherein the communications network comprises user equipment and a blockchain network, the blockchain network comprising:

at least one data plane node;

a first control plane node, wherein the first control plane node is an internet of things (IOT) industry customer entity node that that generates identifications for a plurality of user equipment in the communications network; and a second control plane node, wherein the second control plane node is an operator management device of the communications network, and the first control plane node comprises:

at least one processor; and a non-transitory computer-readable storage medium coupled to the at least one processor and storing programming instructions for execution by the at least one processor, wherein the programming instructions instruct the at least one processor to:

generate a first identification, a first public key, and a first private key for the user equipment;

sign the first identification and the first public key based on a second private key of the first control plane node, to obtain first transaction data; and broadcast the first transaction data in the blockchain network; and wherein the communications network further comprises an authentication unit, and the authentication unit comprises:
- at least one another processor; and
- a non-transitory another computer-readable storage medium coupled to the at least one another processor and storing another programming instructions for execution by the at least one another processor, wherein the another programming instructions instruct the at least one another processor to:
  - receive first identification information sent by the user equipment;
  - query, based on the first identification information, the first transaction data corresponding to the first identification;
  - verify, the first transaction data;
  - after the verification succeeds:
    - generate a first key; and
    - encrypt the first key based on the first public key, to obtain a first encrypted ciphertext;
  - send, to the user equipment, the first encrypted ciphertext and identity management transaction data that is of the authentication unit;
  - receive a second encrypted ciphertext sent by the user equipment, wherein the second encrypted ciphertext comprises the first key and a second key, and wherein authentication on the user equipment uses the second encrypted ciphertext;
  - decrypt the second encrypted ciphertext based on a third private key of the authentication unit, to obtain the first key and the second key;
  - encrypt the second key based on the first public key, to obtain a third encrypted ciphertext; and
  - send the third encrypted ciphertext to the user equipment, wherein authentication on the authentication unit uses the third encrypted ciphertext.

8. The communications network according to claim 7, wherein the programming instructions further instruct the at least one processor to:
send the first transaction data and signature data generated through consensus calculation to the at least one data plane node for storage.

9. The communications network according to claim 7, wherein the programming instructions further instruct the at least one processor to:
sign a second identification and a second public key of the first control plane node based on the second private key, to obtain second transaction data; and
broadcast the second transaction data in the blockchain network, wherein the second transaction data is used to register the first control plane node as a node in the blockchain network.

10. A communications network, wherein the communications network comprises user equipment and a blockchain network, the blockchain network comprising:
- a first control plane node, wherein the first control plane node is an internet of things (IOT) industry customer entity node that that generates identifications for a plurality of user equipment in the communications network;
- at least one data plane node; and
- a second control plane node, wherein the second control plane node is an operator management device of the communications network, and the second control plane node comprises:
  - at least one processor; and
  - a non-transitory computer-readable storage medium coupled to the at least one processor and storing programming instructions for execution by the at least one processor, wherein the programming instructions instruct the at least one processor to:
    - receive first transaction data, wherein the first transaction data comprise a first identification of the user equipment and a first public key of the user equipment that are signed with a second private key of the first control plane node;
    - verify the first transaction data based on a second public key of the first control plane node; and
    - after the verification of the first transaction data succeeds, performing consensus calculation on the first transaction data; and
- wherein the communications network further comprises an authentication unit, and the authentication unit comprises:
  - at least one another processor; and
  - a non-transitory another computer-readable storage medium coupled to the at least one another processor and storing another programming instructions for execution by the at least one another processor, wherein the another programming instructions instruct the at least one another processor to:
    - receive first identification information sent by the user equipment;
    - query, based on the first identification information, the first transaction data corresponding to the first identification;
    - verify, the first transaction data;
    - after the verification succeeds:
      - generate a first key; and
      - encrypt the first key based on the first public key, to obtain a first encrypted ciphertext;
    - send, to the user equipment, the first encrypted ciphertext and identity management transaction data that is of the authentication unit;
    - receive a second encrypted ciphertext sent by the user equipment, wherein the second encrypted ciphertext comprises the first key and a second key, and wherein authentication on the user equipment uses the second encrypted ciphertext;
    - decrypt the second encrypted ciphertext based on a third private key of the authentication unit, to obtain the first key and the second key;
    - encrypt the second key based on the first public key, to obtain a third encrypted ciphertext; and
    - send the third encrypted ciphertext to the user equipment, wherein authentication on the authentication unit uses the third encrypted ciphertext.

11. The communications network according to claim 10, wherein the programming instructions further instruct the at least one processor to:
in response to determining that the first identification in the first transaction data is a new identification:
  sign the first transaction data based on a private key of the second control plane node; and
  send signature data obtained after the first transaction data is signed to another control plane node or the at least one data plane node.

12. The communications network according to claim 10, wherein the programming instructions further instruct the at least one processor to:
   send the first transaction data and signature data generated through the consensus calculation to the at least one data plane node for storage.

13. The communications network according to claim 10, wherein the programming instructions further instruct the at least one processor to:
   configure a third identification, a third public key, and a third private key for an authentication unit;
   sign the third identification and the third public key based on a private key of the second control plane node, to obtain identity management transaction data of the authentication unit; and
   send the identity management transaction data to the authentication unit.

\* \* \* \* \*

UNITED STATES PATENT AND TRADEMARK OFFICE
CERTIFICATE OF CORRECTION

PATENT NO. : 11,784,788 B2
APPLICATION NO. : 17/009145
DATED : October 10, 2023
INVENTOR(S) : Yizhen Wu, Yada Huang and He Guan Page 1 of 1

It is certified that error appears in the above-identified patent and that said Letters Patent is hereby corrected as shown below:

In the Claims

Column 30, Line 56, Claim 1, please delete "(IOT)" and insert therefore -- (IoT) --;

Column 32, Line 46, Claim 7, please delete "(IOT)" and insert therefore -- (IoT) --;

Column 32, Line 47, Claim 7, after "that" please delete "that";

Column 33, Line 60, Claim 10, please delete "(IOT)" and insert therefore -- (IoT) --;

Column 33, Line 61, Claim 10, after "that" please delete "that".

Signed and Sealed this
Twenty-third Day of July, 2024

Katherine Kelly Vidal
*Director of the United States Patent and Trademark Office*